(12) United States Patent
Nishijima et al.

(10) Patent No.: US 10,018,386 B2
(45) Date of Patent: Jul. 10, 2018

(54) EJECTOR

(71) Applicant: DENSO CORPORATION, Kariya, Aichi-pref. (JP)

(72) Inventors: Haruyuki Nishijima, Kariya (JP); Kenta Kayano, Kariya (JP); Yoshiaki Takano, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 106 days.

(21) Appl. No.: 14/898,704

(22) PCT Filed: May 27, 2014

(86) PCT No.: PCT/JP2014/002785
§ 371 (c)(1),
(2) Date: Dec. 15, 2015

(87) PCT Pub. No.: WO2014/203461
PCT Pub. Date: Dec. 24, 2014

(65) Prior Publication Data
US 2016/0116195 A1    Apr. 28, 2016

(30) Foreign Application Priority Data

Jun. 18, 2013  (JP) .................................. 2013-127579

(51) Int. Cl.
*F25B 41/00* (2006.01)
*F04F 5/16* (2006.01)
*F25B 5/02* (2006.01)
*F04F 5/20* (2006.01)
(Continued)

(52) U.S. Cl.
CPC ................ *F25B 41/00* (2013.01); *F04F 5/16* (2013.01); *F04F 5/20* (2013.01); *F04F 5/46* (2013.01);
(Continued)

(58) Field of Classification Search
CPC .... F25B 41/00; F25B 5/02; F25B 2341/0011; F25B 2341/0013; F25B 2341/0015;
(Continued)

(56) References Cited

U.S. PATENT DOCUMENTS

2002/0000095 A1* 1/2002 Takeuchi .................. F04F 5/04
62/500
2004/0007013 A1    1/2004 Takeuchi
(Continued)

FOREIGN PATENT DOCUMENTS

EP    2080967 A1 *  7/2009  .............. F25B 41/00
JP    S60108600 A    6/1985
(Continued)

OTHER PUBLICATIONS

International Search Report and Written Opinion (in Japanese with English Translation) for PCT/JP2014/002785, dated Aug. 19, 2014; ISA/JP.
(Continued)

*Primary Examiner* — Emmanuel Duke
(74) *Attorney, Agent, or Firm* — Harness, Dickey & Pierce, P.L.C.

(57) ABSTRACT

A swirl space forming member that forms a swirl space in which a refrigerant flowing into a nozzle portion of an ejector swirls around an axis of the nozzle portion. In this way, even when the refrigerant flowing out of a first evaporator is a gas-phase refrigerant, pressure of the refrigerant on a swirling center axis side in the swirl space is reduced to be able to start condensation by swirling the refrigerant, and a gas-liquid two-phase refrigerant in which a condensation nucleus is generated can flow into the nozzle portion. Thus, occurrence of a condensation delay in the refrigerant in the nozzle portion can be restricted.

9 Claims, 17 Drawing Sheets

(51) Int. Cl.
*F04F 5/46* (2006.01)
*B60H 1/32* (2006.01)

(52) U.S. Cl.
CPC ........ *F25B 5/02* (2013.01); *B60H 2001/3298* (2013.01); *F25B 2341/0011* (2013.01); *F25B 2341/0012* (2013.01); *F25B 2341/0013* (2013.01); *F25B 2341/0015* (2013.01)

(58) Field of Classification Search
CPC ....... F25B 2341/0012; F04F 5/46; F04F 5/20; F04F 5/16; B60H 2001/3298
See application file for complete search history.

(56) References Cited

U.S. PATENT DOCUMENTS

| | | | |
|---|---|---|---|
| 2004/0172966 A1 | 9/2004 | Ozaki et al. | |
| 2004/0255610 A1* | 12/2004 | Nishijima | F25B 41/00 62/500 |
| 2006/0254308 A1* | 11/2006 | Yokoyama | B60H 1/3205 62/500 |
| 2007/0028630 A1* | 2/2007 | Yamada | F25B 5/00 62/170 |
| 2007/0039349 A1* | 2/2007 | Yamada | F25B 41/00 62/500 |
| 2010/0175422 A1* | 7/2010 | Yamada | F25B 41/00 62/512 |
| 2013/0000348 A1* | 1/2013 | Higashiiue | C09K 5/041 62/500 |
| 2016/0186783 A1 | 6/2016 | Nishijima et al. | |

FOREIGN PATENT DOCUMENTS

| | | | |
|---|---|---|---|
| JP | 2004044412 A | | 2/2004 |
| JP | 2004270460 A | | 9/2004 |
| JP | 2006292351 A | | 10/2006 |
| JP | 2007032945 A | | 2/2007 |
| JP | 2009133624 A | | 6/2009 |
| JP | 2012149790 A | | 8/2012 |
| JP | 2013068199 A | | 4/2013 |
| KR | 20020037606 A | * | 5/2002 |
| KR | 20020037606 A | * | 5/2002 |
| WO | WO-2014156075 A1 | | 10/2014 |
| WO | WO-2014203462 A1 | | 12/2014 |

OTHER PUBLICATIONS

Shigeru Matsuo et al., "Avoidance of Self-excited Oscillation of Condensation Shock Wave Using a Double Slot", Transactions of the Japan Society of Mechanical Engineers (Series B), vol. 68, No. 676 (Dec. 2002), pp. 3338-3345.

Shigeru Matsuo et al., "Studies Regarding Shock Wave", Transactions of the Japan Society of Mechanical Engineers (Series B), vol. 50, No. 459 (Nov. 1984), pp. 2577-2582.

Shigeru Matsuo et al., "CFD Investigation of Passive Control on Condendsation Shock Wave", Transactions of the Japan Society of Mechanical Engineers (Series B), vol. 67, No. 660 (Aug. 2001), pp. 1952-1959.

* cited by examiner

EJECTOR

CROSS REFERENCE TO RELATED APPLICATIONS

This application is a U.S. National Phase Application under 35 U.S.C. 371 of International Application No. PCT/JP2014/002785 filed on May 27, 2014 and published in Japanese as WO 2014/203461 A1 on Dec. 24, 2014. This application is based on and claims the benefit of priority from Japanese Patent Application No. 2013-127579 filed on Jun. 18, 2013. The entire disclosures of all of the above applications are incorporated herein by reference.

TECHNICAL FIELD

The present disclosure relates to an ejector that decompresses a fluid and draws the fluid by a suction action of an injected fluid injected at a high velocity.

BACKGROUND ART

Conventionally, a vapor compressional refrigeration cycle device that includes an ejector (hereinafter referred to as an ejector-type refrigeration cycle) is known.

In this type of the ejector-type refrigeration cycle, a refrigerant flowing out of an evaporator is drawn by a suction action of a high-velocity injection refrigerant injected from a nozzle portion of the ejector, pressure of a mixed refrigerant of the injection refrigerant and the suction refrigerant is boosted by converting kinetic energy of the mixed refrigerant to pressure energy in a diffuser section (i.e., a pressure increase portion) of the ejector, and the mixed refrigerant flows out to a suction side of a compressor.

In this way, in the ejector-type refrigeration cycle, consumed power by the compressor is reduced, and a coefficient of performance (COP) of the cycle is improved in comparison with a general refrigeration cycle device in which refrigerant evaporation pressure in an evaporator is substantially equal to suction refrigerant pressure in a compressor.

Furthermore, for example, Patent Literature 1 discloses such an ejector-type refrigeration cycle that includes two evaporators, in which a refrigerant flowing out of the evaporator on a high refrigerant evaporation pressure side flows into a nozzle portion of an ejector, and in which a refrigerant flowing out of the evaporator on a low refrigerant evaporation pressure side is drawn by a suction action of the injection refrigerant, as a specific configuration thereof.

PRIOR ART LITERATURES

Patent Literature

Patent Literature 1: JP 2012-149790 A

SUMMARY OF INVENTION

However, according to consideration of the inventors of the subject application, there is a case where, when the ejector-type refrigeration cycle of Patent Literature 1 is actually actuated, a diffuser section of the ejector cannot exert desired refrigeration boosting performance, and an effect in improving the COP by including the ejector cannot be obtained sufficiently.

In view of the above point, it is an objective of the present disclosure to restrict deterioration of a refrigerant-pressure boosting performance of an ejector, by which a refrigerant flowing out of an evaporator flows into a nozzle portion.

In detail, it is an objective of the present disclosure to restrict the deterioration of the refrigerant-pressure boosting performance by restricting a condensation delay in the nozzle portion in the ejector, by which the refrigerant flowing out of the evaporator flows into the nozzle portion.

An ejector of the present disclosure is applied to a vapor compressional refrigeration cycle device that has a first evaporator and a second evaporator evaporating a refrigerant.

The ejector has a nozzle portion and a body portion. The nozzle portion decompresses the refrigerant flowing out of the first evaporator until the refrigerant becomes a gas-liquid two-phase state and injects the refrigerant from a refrigerant injection port. A refrigerant suction port is provided in the body portion and draws a refrigerant flowing out of the second evaporator as a suction refrigerant by a suction action of an injection refrigerant injected from the nozzle portion. A pressure increase portion is provided in the body portion and boosts pressure of a mixed refrigerant of the injection refrigerant and the suction refrigerant.

The ejector further has a swirl space forming member that forms a swirl space in which the refrigerant flowing into the nozzle portion swirls around an axis of the nozzle portion.

According to the above, the swirl space forming member for forming the swirl space is provided. Accordingly, the refrigerant swirls in the swirl space, and in this way, the condensation of the refrigerant on a swirling center axis side in the swirl space is started, and the gas-liquid two-phase refrigerant in which a condensation nucleus is generated can flow into the nozzle portion.

Accordingly, the occurrence of the condensation delay in the refrigerant in the nozzle portion can be restricted. As a result, according to the present disclosure, the refrigerant pressure boosting performance in a pressure increase portion can be stabilized, and the deterioration of the refrigerant pressure boosting performance can be restricted by restricting a condensation delay in the nozzle portion in the ejector, by which the refrigerant flowing out of the evaporator flows into the nozzle portion.

DESCRIPTION OF EMBODIMENTS

The present disclosure improves Patent Literature 1. According to consideration of the inventors of the subject application, there is a case where, when the ejector-type refrigeration cycle of Patent Literature 1 is actually actuated, the diffuser section of the ejector cannot exert the desired refrigeration boosting performance, and the effect in improving the COP by including the ejector cannot be obtained sufficiently.

Figure 3:
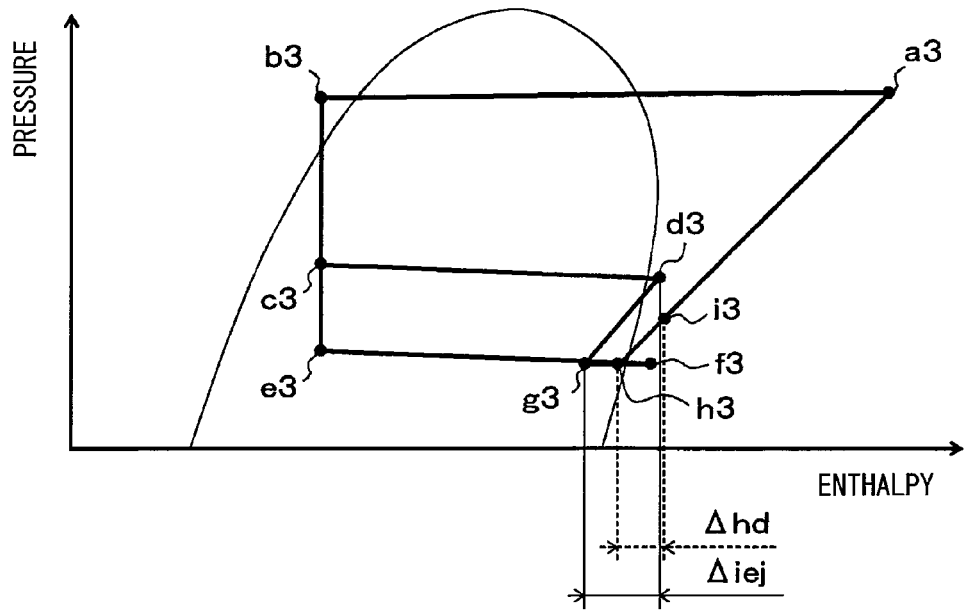
FIG. 3 is a Molier diagram that depicts a state of a refrigerant at a time that the ejector-type refrigeration cycle of the first embodiment is actuated.

Thus, the inventors of the subject application researched a cause, and it was understood that the cause was that, in the ejector-type refrigerant cycle of Patent Literature 1, the gas-phase refrigerant was condensed while being decompressed in the refrigerant passage provided in the nozzle portion of the ejector, that is, the refrigerant is decompressed in the nozzle portion of the ejector in a manner to cross a saturated gas line as indicated in a decompression process from a point d3 to a point g3 in a Molier diagram in FIG. 3, which will be described in the embodiment below.

Figure 25:
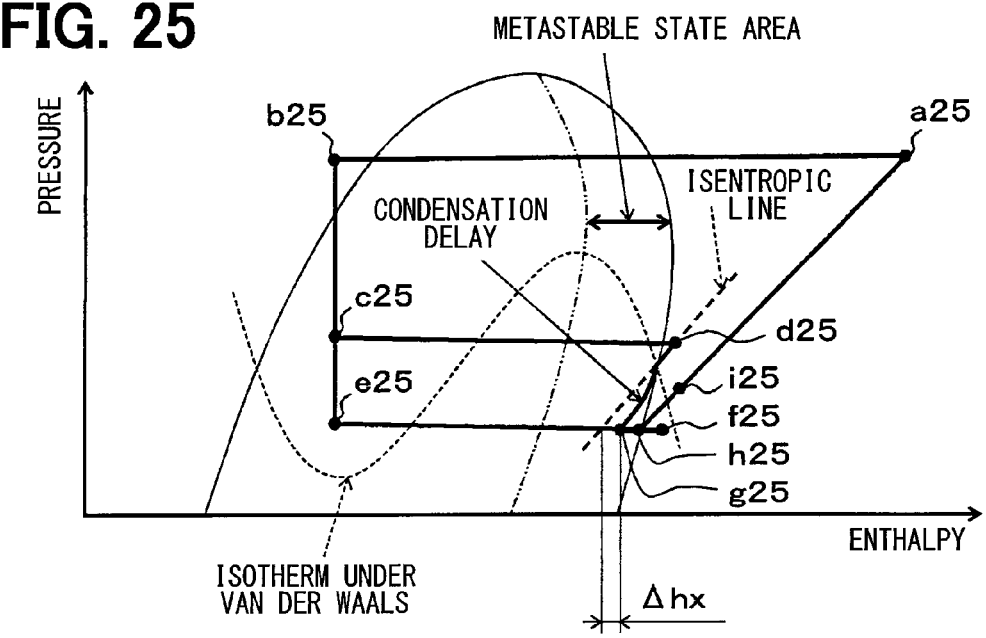
FIG. 25 is a Molier diagram that depicts a state of the refrigerant at a time that a condensation delay occurs in a nozzle portion of the ejector.

A reason therefor is because, in such a decompression process, when the gas-phase refrigerant that flows through the refrigerant passage formed in a nozzle portion 18a is condensed, as indicated by a point d25→a point g25 in FIG. 25, a condensation delay, in which condensation is not immediately started even in a saturated state and the refrigerant turns into an oversaturated state, possibly occurs.

It should be noted that FIG. 25 is a Molier diagram that depicts a change in a state of the refrigerant in the case where the condensation delay occurs. The refrigerant in the same state as that in FIG. 3 is denoted by the same reference sign (i.e., alphabet) as that in FIG. 3, and only a suffix (number) is changed. The same applies to the other Molier diagrams.

Here, a cause of the occurrence of such a condensation delay will be described. When a force between molecules that is a van der Waals force is taken into consideration, as indicated in the Molier diagram in FIG. 25, an isotherm of a gas-liquid two-phase refrigerant is drawn as a curve that is deviated from an isopiestic line.

Accordingly, the refrigerant in a region where an enthalpy thereof is slightly reduced from that on a saturated gas line turns into a metastable state in which the refrigerant cannot be condensed unless a temperature thereof is reduced to be lower than the refrigerant on the saturated gas line at the same pressure. Thus, when the gas-phase refrigerant flows into the nozzle portion 18a, the condensation delay in which the condensation of the refrigerant in the metastable state is not started until the temperature thereof is reduced to some extent occurs.

When the condensation delay further occurs, the enthalpy of an injection refrigerant is increased (corresponds to $\Delta hx$ in FIG. 25) in comparison with a case where the refrigerant is expanded in an isentropic manner in the nozzle portion. An increased amount of this enthalpy corresponds to a latent heat release amount, and energy is released in the amount as latent heat when the refrigerant flows through the refrigerant passage formed in the nozzle portion. Thus, when this latent heat release amount is increased, the shock wave is generated in the refrigerant that flows through the refrigerant passage formed in the nozzle portion.

Then, the shock wave that is generated at a time that the refrigerant releases the latent heat makes the flow velocity of the injection refrigerant unstable. Thus, refrigerant pressure boosting performance in the diffuser section is deteriorated.

In view of the above point, the present disclosure has a purpose of restricting deterioration of refrigerant pressure boosting performance of an ejector, by which a refrigerant flowing out of an evaporator flows into a nozzle portion.

In detail, the present disclosure has a purpose of restricting the deterioration of the refrigerant pressure boosting performance by restricting a condensation delay in the nozzle portion in the ejector, by which the refrigerant flowing out of the evaporator flows into the nozzle portion.

In embodiments, which will be described below, a description will be made on modes in which means for restricting a diffuser section (i.e., a pressure increase portion) of an ejector from being incapable of exerting desired refrigerant pressure boosting performance in an ejector-type refrigerant cycle in such a configuration that a refrigerant flowing out of an evaporator flows into a nozzle portion of the ejector. Furthermore, the embodiments, which will be described below, include modes as prerequisites of the present disclosure and modes as references.

First Embodiment

A description will hereinafter be made on a first embodiment by using FIG. 1 to FIG. 4. In this embodiment, an ejector-type refrigeration cycle 10 that includes an ejector 18 is applied to a vehicular refrigeration cycle device. More specifically, the ejector-type refrigeration cycle 10 exerts a function of cooling vehicle cabin inside air to be blown into a vehicle cabin and a function of cooling box inside air to be blown into an in-vehicle refrigerator (cool box) arranged in the vehicle cabin.

Figure 1:
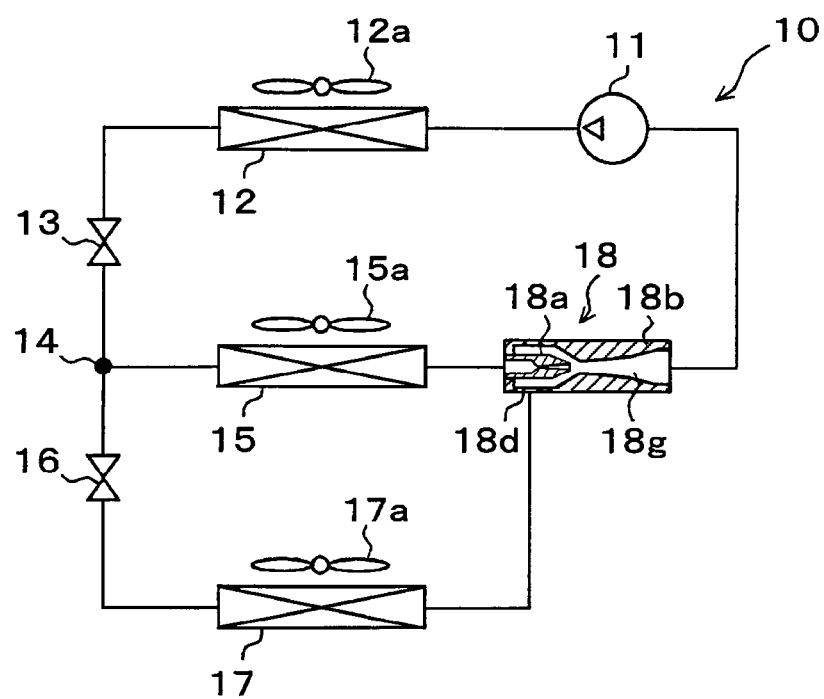
FIG. 1 is an overall configuration diagram of an ejector-type refrigeration cycle of a first embodiment.

In the ejector-type refrigeration cycle 10 shown in an overall configuration diagram of FIG. 1, a compressor 11 draws a refrigerant, compresses the refrigerant to make it a high-pressure refrigerant, and discharges the high-pressure refrigerant. More specifically, the compressor 11 of this embodiment is an electric compressor that is configured by accommodating a fixed-capacity-type compression mechanism and an electric motor for driving the compression mechanism in a housing.

Any of various types of compression mechanisms, such as a scroll-type compression mechanism and a vane-type compression mechanism, can be adopted as the compression mechanism. In addition, actuation (i.e., a rotational velocity) of the electric motor is controlled by a control signal output from a controller, which will be described below, and any type of an AC motor and a DC motor can be adopted.

Furthermore, the compressor 11 may be an engine-driven-type compressor that is driven by rotational drive power transmitted from a vehicle traveling engine via a pulley, a belt, and the like. As this type of the engine-driven-type compressor, a variable-capacity-type compressor that can adjust a refrigerant discharging ability by a change in discharging capacity, a fixed-capacity-type compressor that adjusts the refrigerant discharging ability by changing an operation rate of the compressor through connection/disconnection of an electromagnetic clutch, and the like can be adopted.

In addition, an HFC-based refrigerant (more specifically, R134a) is adopted as the refrigerant in the ejector-type refrigeration cycle 10, and a vapor compressional subcritical refrigeration cycle in which pressure of a high-pressure side refrigerant does not exceed critical pressure of the refrigerant is configured. Furthermore, refrigerator oil for lubricating the compressor 11 is mixed in the refrigerant, and some of the refrigerator oil circulates through the cycle together with the refrigerant.

A refrigerant inlet side of a heat radiator 12 is connected to a discharge port side of the compressor 11. The heat radiator 12 is a heat-radiating heat exchanger that radiates heat from a high-pressure refrigerant discharged from the compressor 11 and cools the high-pressure refrigerant by exchanging heat between the high-pressure refrigerant and vehicle cabin outside air (i.e., outside air) blown by a cooling fan 12a. The cooling fan 12a is an electric blower, a rotational velocity (i.e., an air volume) of which is controlled by a control voltage output from the controller.

An inlet side of a high-stage-side throttle device 13 as a first decompression section is connected to a refrigerator outlet side of the heat radiator 12. The high-stage-side throttle device 13 has a thermometer section that detects an overheat degree of an outlet side refrigerant of a first evaporator 15 on the basis of a temperature and pressure of the outlet side refrigerant of the first evaporator 15. The high-stage-side throttle device 13 is a thermal expansion valve that adjusts a flow passage area by using a mechanical mechanism such that the overheat degree of the outlet side refrigerant of the first evaporator 15 falls within a predetermined reference range.

A refrigerant inflow port of a branch section 14 for dividing a flow of the refrigerant flowing from the high-stage-side throttle device 13 is connected to an outlet side of the high-stage-side throttle device 13. The branch section 14 is constructed of a three-way joint that has three inflow/outflow ports. One of the three inflow/outflow ports is set as a refrigerant inflow port, whereas the remainded two inflow/outflow ports are set as refrigerant outflow ports. Such a three-way joint may be formed by joining pipes with different pipe diameters, or may be formed by providing the plural refrigerant passages to a metallic block or a resinous block.

A refrigerant inlet side of the first evaporator 15 is connected to one of the refrigerant outflow ports of the branch section 14. The first evaporator 15 is a heat absorbing heat exchanger that evaporates a low-pressure refrigerant and exerts a heat absorbing action by exchanging heat between the low-pressure refrigerant, pressure of which has been reduced in the high-stage-side throttle device 13, and the vehicle cabin inside air to be blown into the vehicle cabin from a first blower fan 15a. The first blower fan 15a is an electric blower, a rotational velocity of which (i.e., an air volume) is controlled by a control voltage output from the controller.

An inlet side of a low-stage-side throttle device 16 as a second decompression section is connected to the other refrigerator outlet port of the branch section 14. The low-stage-side throttle device 16 is a fixed-throttle, an opening degree of which is fixed. More specifically, a nozzle, an orifice, a capillary tube, or the like can be adopted.

A refrigerant inlet side of a second evaporator 17 is connected to an outlet side of the low-stage-side throttle device 16. The second evaporator 17 is a heat absorbing heat exchanger that evaporates the low-pressure refrigerant and exerts a heat absorbing action by exchanging heat between the low-pressure refrigerant, pressure of which has been reduced in the low-stage-side throttle device 16, and the box inside air to be circulated and blown into the cool box. A basic configuration of the second evaporator 17 is equivalent to that of the first evaporator 15.

Here, the refrigerant that flows into the second evaporator 17 is further decompressed in the low-stage-side throttle device 16 after being decompressed in the high-stage-side throttle device 13. Thus, refrigerant evaporating pressure (i.e., a refrigerant evaporating temperature) in the second evaporator 17 is lower than the refrigerant evaporating pressure (i.e., the refrigerant evaporating temperature) in the first evaporator 15. In addition, a second blower fan 17a is an electric blower, a rotational velocity (i.e., an air volume) of which is controlled by a control voltage output from the controller.

Next, an inlet side of the nozzle portion 18a of the ejector 18 is connected to a refrigerant outlet side of the first evaporator 15. The ejector 18 fulfills a function as a decompressor that decompresses the downstream-side refrigerant of the first evaporator 15 and also fulfills a function as a refrigerant circulating section (i.e., a refrigerant transporting section) that draws (i.e., transports) the refrigerant by a suction action of the injection refrigerant injected at a high velocity and makes the refrigerant circulate through the cycle.

A detailed configuration of the ejector 18 will be described by using FIG. 2. The ejector 18 has the nozzle portion 18a and a body portion 18b. First, the nozzle portion 18a is made of metal (e.g., stainless steel alloy) or the like to have a generally cylindrical shape that is gradually tapered toward a refrigerant flow direction. The nozzle portion 18a decompresses and expands the refrigerant in an isentropic manner in a refrigerant passage (i.e., a throttle passage) formed on the inside.

In the refrigerant passage formed in the nozzle portion 18a, a throat section, in which a refrigerant passage area is maximally reduced, (i.e., a minimum passage area section)

is provided, and a flare section, in which the refrigerant passage cross-sectional area is gradually increased from the throat section toward a refrigerant injection port 18*c* for injecting the refrigerant is provided. That is, the nozzle portion 18*a* of this embodiment is configured as a so-called de Laval nozzle.

According to the nozzle portion 18*a* of this embodiment, the injection refrigerant that is injected from the refrigerant injection port 18*c* becomes a gas-liquid two-phase state during a normal operation of the ejector-type refrigeration cycle 10. Furthermore, a flow velocity of the refrigerant that is immediately before being injected from the refrigerant injection port 18*c* becomes higher than or equal to the two-phase sound velocity αh.

Here, the two-phase sound velocity αh is a sound velocity of a fluid in a gas-liquid mixed state in which a gas-phase fluid and a liquid-phase fluid are mixed, and is defined by the following formula F1.

$$\alpha h = [P/\{\alpha \times (1-\alpha) \times \rho l\}]^{0.5} \quad (F1)$$

α in the formula F1 is a void fraction and indicates a capacity ratio of voids (i.e., air bubbles) contained per unit volume. In detail, the void fraction a is defined by the following formula F2.

$$\alpha = x/\{x + (\rho g/\rho l) \times (1-x)\} \quad (F2)$$

In addition, ρg in the formulae F1, F2 is gas-phase fluid density, ρl is liquid-phase fluid density, and P is pressure of the two-phase fluid.

Next, the body portion 18*b* is made of metal (e.g., aluminum) or a resin to have generally a cylindrical shape, functions as a fixing member that supports and fixes the nozzle portion 18*a* on the inside thereof, and forms an outer shell of the ejector 18. More specifically, the nozzle portion 18*a* is fixed by press-fitting or the like so as to be accommodated in a portion on one end side in a longitudinal direction of the body portion 18*b*.

In addition, a portion of an outer circumferential side surface of the body portion 18*b* that corresponds to the outer circumferential side of the nozzle portion 18*a* is formed with a refrigerant suction port 18*d* that is provided to penetrate therethrough and communicate with the refrigerant injection port 18*c* of the nozzle portion 18*a*. The refrigerant suction port 18*d* is a through hole through which the refrigerant flowing out of the second evaporator 17 is drawn into the ejector 18 by the suction action of the injection refrigerant injected from the refrigerant injection port 18*c* of the nozzle portion 18*a*.

Furthermore, on the inside of the body portion 18*b*, (i) a mixing portion 18*e* that mixes the injection refrigerant injected from the refrigerant injection port 18*c* and the suction refrigerant drawn from the refrigerant suction port 18*d*, (ii) a suction passage 18*f* that guides the suction refrigerant drawn from the refrigerant suction port 18*d* to the mixing portion 18*e*, and (iii) a diffuser section 18*g* as a pressure increase portion that boosts pressure of the mixed refrigerant mixed in the mixing portion 18*e* are provided.

The suction passage 18*f* is formed by a space between an outer circumferential side near a tip in a tapered shape of the nozzle portion 18*a* and an inner circumferential side of the body portion 18*b*. A refrigerant passage area of the suction passage 18*f* is gradually reduced toward the refrigerant flow direction. In this way, a flow velocity of the suction refrigerant that flows through the suction passage 18*f* is gradually increased, and energy loss (mixing loss) at a time that the suction refrigerant and the injection refrigerant are mixed in the mixing portion 18*e* is thereby reduced.

Of an internal space of the body portion 18*b*, the mixing portion 18*e* is formed in a space within an area that is from the refrigerant injection port 18*c* of the nozzle portion 18*a* to an inlet section 18*h* of the diffuser section 18*g* in an axial cross section of the nozzle portion 18*a*. Furthermore, an axial distance La of the nozzle portion 18*a* that is from the refrigerant injection port 18*c* in the mixing portion 18*e* to the inlet section 18*h* is determined such that a flow velocity of the refrigerant flowing into the inlet section 18*h* becomes lower than or equal to the two-phase sound velocity αh.

More specifically, in this embodiment, in a cross section of the nozzle portion 18*a* that is perpendicular to an axial direction thereof and that includes the refrigerant injection port 18*c*, a circle has a total value of a circular opening cross-sectional area of the refrigerant injection port 18*c* and an arcuate refrigerant passage cross-sectional area of the suction passage 18*f*. When a corresponding diameter of such a circle is referred to as ϕDa, the distance La is determined to satisfy the following formula F3.

$$La/\phi Da \leq 1 \quad (F3)$$

In this embodiment, more specifically, the distance La is determined to satisfy La/ϕDa=1 (e.g., each of the corresponding diameter ϕDa and the distance La is 8 mm). However, for example, the corresponding diameter ϕDa and the distance La may be set at 9 mm and 7 mm, respectively.

Furthermore, the mixing portion 18*e* of this embodiment is formed in a shape to reduce the refrigerant passage cross-sectional area toward a refrigerant flow downstream side. The refrigerant passage cross-sectional area is an area of a cross section of the refrigerant passage in a line that is perpendicular to the axial direction of the nozzle portion 18*a*. More specifically, the mixing portion 18*e* is formed in a shape that is a combination of (i) a truncated cone shape in which the refrigerant passage cross-sectional area is gradually reduced toward the refrigerant flow downstream side and (ii) a columnar shape in which the refrigerant passage cross-sectional area is fixed. Moreover, the mixing portion 18*e* is formed in a shape in which the refrigerant passage cross-sectional area of the inlet section 18*h* of the diffuser section 18*g* is smaller than the refrigerant passage cross-sectional area of the refrigerant injection port 18*c*.

Figure 2:
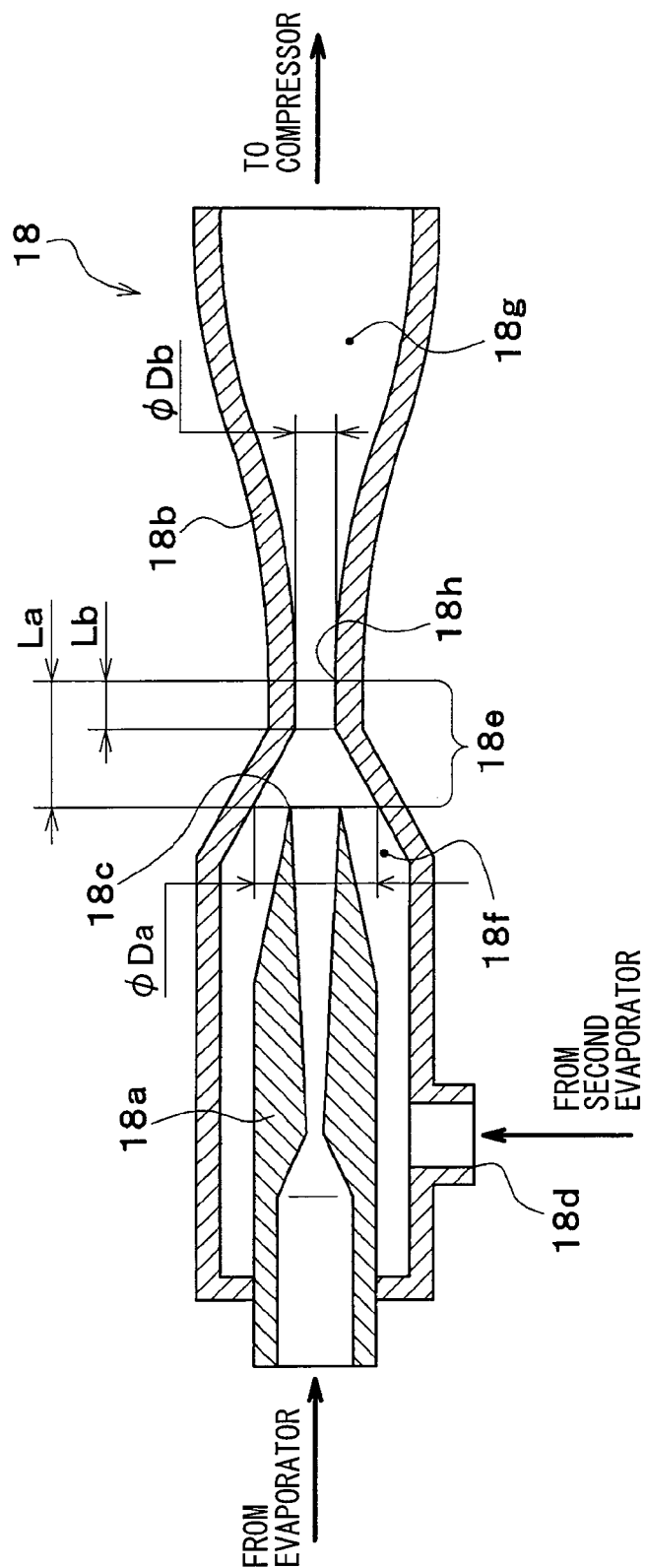
FIG. 2 is an axial cross-sectional view of the ejector of the first embodiment.

In addition, as shown in FIG. 2, when an axial length of the nozzle portion 18*a* in a columnar-shaped portion of the mixing portion 18*e* is referred to as Lb and a diameter of the columnar-shaped portion (corresponds to a diameter of the inlet section 18*h* of the diffuser section 18*g*) is referred to as ϕDb, the distance Lb is determined to satisfy the following formula F4.

$$Lb/\phi Db \leq 1 \quad (F4)$$

In this embodiment, more specifically, the distance Lb is determined to satisfy Lb/ϕDb=1 (e.g., each of the corresponding diameter ϕDb and the distance Lb is 7 mm). However, for example, the corresponding diameter ϕDb and the distance Lb may be set at 7 mm and 6 mm, respectively.

The diffuser section 18*g* is arranged to continue from an outlet of the mixing portion 18*e* and is formed such that the refrigerant passage cross-sectional area is gradually increased. Accordingly, the diffuser section 18*g* fulfills a function of converting velocity energy of the mixed refrigerant, after flowing out of the mixing portion 18*e*, to pressure energy, that is, a function of boosting the pressure of the mixed refrigerant by lowering the flow velocity of the mixed refrigerant.

More specifically, as shown in FIG. 2, a wall surface shape of an inner circumferential wall surface of the body portion 18b that forms the diffuser section 18g of this embodiment is formed by combining plural curves. An expansion degree of the refrigerant passage cross-sectional area in the diffuser section 18g is gradually increased toward the refrigerant flow downstream direction, and is then reduced again. In this way, the pressure of the refrigerant can be increased in the isentropic manner.

A suction port of the compressor 11 is connected to a refrigerant outlet side of the diffuser section 18g of the ejector 18.

Next, an electric control unit of this embodiment will be described. The controller, which is not shown, is constructed of a well-known microcomputer that includes a CPU, a ROM, a RAM, and the like and a peripheral circuit thereof. The controller performs various types of computations and processes on the basis of a control program stored in the ROM thereof and controls actuation of various types of control target equipment 11, 12a, 15a, 17a, and the like connected to an output side.

In addition, a sensor group of an inside air temperature sensor, an outside air temperature sensor, a solar radiation sensor, a first evaporator temperature sensor, a second evaporator temperature sensor, an outlet side temperature sensor, an outlet side pressure sensor, a box inside temperature sensor and the like is connected to the controller, and detection values of the sensor group are input thereto. The inside air temperature sensor detects a vehicle cabin inside temperature. The outside air temperature sensor detects an outside air temperature. The solar radiation sensor detects an amount of solar radiation in the vehicle cabin. The first evaporator temperature sensor detects a blowoff air temperature of the first evaporator 15 (i.e., an evaporator temperature). The second evaporator temperature sensor detects a blowoff air temperature of the second evaporator 17 (i.e., an evaporator temperature). The outlet side temperature sensor detects a temperature of the outlet side refrigerant of the heat radiator 12. The outlet side pressure sensor detects a pressure of the outlet side refrigerant of the heat radiator 12.

Furthermore, an operation panel that is not shown and is arranged near a dashboard at the forefront on the inside of the vehicle cabin is connected to an input side of the controller, and operation signals from various operation switches provided on the operation panel are input to the controller. As the various operation switches provided in the operation panel, an air-conditioner actuation switch for requesting air conditioning of the inside of the vehicle cabin, a vehicle cabin inside temperature setting switch for setting the vehicle cabin inside temperature, and the like are provided.

In the controller of this embodiment, the control units for controlling actuation of various types of control target equipment that are connected to the output side thereof are integrally configured. In the controller, a configuration (hardware and software) for controlling the actuation of each type of the control target equipment constitutes the control unit of each type of the control target equipment. For example, in this embodiment, a configuration (hardware and software) for controlling the actuation of the compressor 11 constitutes a discharging ability control unit.

Next, actuation of this embodiment in the above configuration will be described by using the Molier diagram in FIG. 3. First, when the actuation switch on the operation panel is turned (ON), the controller actuates the electric motor of the compressor 11, the cooling fan 12a, the first blower fan 15a, the second blower fan 17a, and the like. Accordingly, the compressor 11 draws, compresses, and discharges the refrigerant.

The gas-phase refrigerant that is after being discharged from the compressor 11 and is in a high-temperature high-pressure state (refer a point a3 in FIG. 3) flows into the heat radiator 12, exchanges heat with the air (i.e., the outside air) blown from the cooling fan 12a, radiates heat, and is condensed (refer the point a3→a point b3 in FIG. 3).

The refrigerant that flowing out of the heat radiator 12 flows into the high-stage-side throttle device 13 and is decompressed in the isentropic manner (refer the point b3→a point c3 in FIG. 3). At this time, a throttle opening degree of the high-stage-side throttle device 13 is adjusted such that the overheat degree of the outlet side refrigerant of the first evaporator 15 (refer a point d3 in FIG. 3) falls within a predetermined specified range.

The flow of the refrigerant decompressed in the high-stage-side throttle device 13 is branched in the branch section 14. One of the refrigerants branched in the branch section 14 flows into the first evaporator 15, absorbs heat from the vehicle cabin inside air blown by the first blower fan 15a, and is evaporated (refer the point c3→the point d3 in FIG. 3). In this way, the vehicle cabin inside air is cooled.

The other of the refrigerants branched in the branch section 14 flows into the low-stage-side throttle device 16 and is further decompressed in the isentropic manner (refer the point c3→a point e3 in FIG. 3). The refrigerant decompressed in the low-stage-side throttle device 16 flows into the second evaporator 17, absorbs heat from the box inside air that is circulated and blown by the second blower fan 17a, and is evaporated (refer the point e3→a point f3 in FIG. 3). In this way, the box inside air is cooled.

In addition, the gas-phase refrigerant flowing out of the first evaporator 15 and having the overheat degree flows into the nozzle portion 18a of the ejector 18, is decompressed in the isentropic manner, and is injected (refer the point d3→a point g3 in FIG. 3). Then, by the suction action of the injection refrigerant, the refrigerant flowing out of the second evaporator 17 is drawn from the refrigerant suction port 18d of the ejector 18.

The injection refrigerant injected from the nozzle portion 18a and the suction refrigerant drawn from the refrigerant suction port 18d are mixed in the mixing portion 18e of the ejector 18 and flow into the diffuser section 18g (refer the point g3→a point h3, the point f3→the point h3 in FIG. 3).

In the diffuser section 18g, the velocity energy of the refrigerant is converted to the pressure energy due to the increase in the refrigerant passage cross-sectional area. Accordingly, the pressure of the mixed refrigerant of the injection refrigerant and the suction refrigerant is increased (refer the point h3→a point i3 in FIG. 3). The refrigerant flowing out of the diffuser section 18g is drawn into the compressor 11 and is compressed again (refer the point i3→the point a3 in FIG. 3).

The ejector-type refrigeration cycle 10 of this embodiment is actuated as described above, and is capable of cooling the vehicle cabin inside air, which is blown into the vehicle cabin, and the box inside air, which is circulated and blown into the cool box. At this time, the refrigerant evaporating pressure (i.e., the refrigerant evaporating temperature) of the second evaporator 17 is lower than the refrigerant evaporating pressure (i.e., the refrigerant evaporating temperature) of the first evaporator 15. Thus, the inside of the vehicle cabin and the inside of the cool box can be cooled in different temperature ranges.

Furthermore, in the ejector-type refrigeration cycle 10, the refrigerant, the pressure of which has been boosted in the diffuser section 18g of the ejector 18, is drawn into the compressor 11. Thus, the coefficient of performance (COP) of the cycle can be improved by reducing the consumed power by the compressor 11.

In the configuration of the ejector-type refrigeration cycle 10 of this embodiment, the gas-phase refrigerant flowing out of the first evaporator 15 and having the overheat degree flows into the nozzle portion 18a of the ejector 18. In such a configuration, the quality x of the mixed refrigerant in the mixing portion 18e also tends to have a relatively high value (e.g., the quality x is higher than or equal to 0.8).

A reason therefor is because, when the mixed refrigerant is the gas-liquid two-phase refrigerant with the relatively high quality x, the gas-liquid two-phase refrigerant generates the shock wave in the vicinity of the diffuser section 18g or in the diffuser section 18g, and the refrigerant pressure boosting performance in the diffuser section 18g of the ejector 18 becomes unstable.

In detail, this shock wave is generated when a flow velocity of a two-phase fluid in a gas-liquid two-phase state is shifted from a state in which the flow velocity is higher than or equal to a two-phase sound velocity $\alpha$h (i.e., a supersonic velocity state) to a state in which the flow velocity is lower than the two-phase sound velocity $\alpha$h (i.e., a subsonic velocity state).

Figure 20:
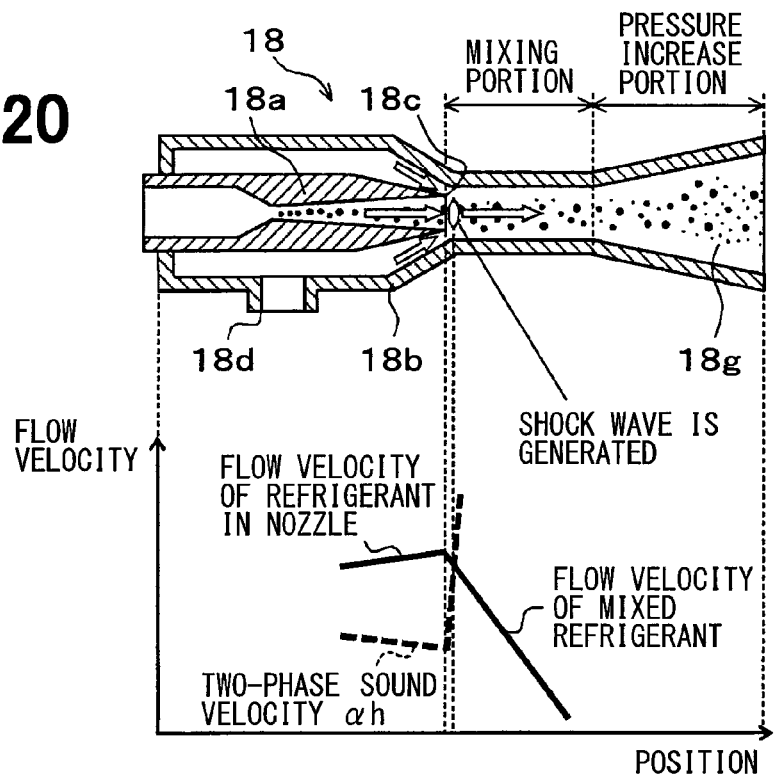
FIG. 20 is an explanatory view for explaining a position where a shock wave is generated in an ejector during an operation of a general ejector-type refrigeration cycle.

A cause of the unstable refrigerant pressure boosting performance in the diffuser section of the ejector by the shock wave will be described by using FIG. 20, FIG. 21. In upper portions of FIG. 20, FIG. 21, axial cross-sections of a general ejector in an axial direction are schematically shown. In order to clarify the illustration, in FIG. 20, FIG. 21, portions that exert the same or equivalent functions as those of the ejector 18, which will be described in the following embodiments, are denoted by the same reference signs as those of the ejector 18.

First, the gas-liquid two-phase refrigerant with the relatively low quality x (e.g., the gas-liquid two-phase refrigerant with the quality x that is lower than or equal to 0.5) flows into the nozzle portion 18a of the ejector 18. In this case, the refrigerant expands in an isentropic manner in the nozzle portion 18a. Thus, the quality x of the refrigerant that is immediately before being injected from a refrigerant injection port 18c of the nozzle portion 18a becomes a lower value than the quality x of the refrigerant that flows into the nozzle portion 18a.

Then, the injection refrigerant that is injected from the refrigerant injection port 18c of the nozzle portion 18a is mixed with the suction refrigerant in the gas-phase state, and thus the quality x thereof is abruptly increased while the flow velocity thereof is reduced. In this way, as indicated by a bold broken line in FIG. 20, the two-phase sound velocity $\alpha$h of the mixed refrigerant of the injection refrigerant and the suction refrigerant is also abruptly increased.

As a result, in the case where the gas-liquid two-phase refrigerant with the relatively low quality x flows into the nozzle portion 18a, the flow velocity of the mixed refrigerant immediately after being injected from the refrigerant injection port 18c becomes lower than the two-phase sound velocity $\alpha$h. The shock wave that is generated at a time that the flow velocity of the two-phase refrigerant is shifted from the supersonic velocity state to the subsonic velocity state is generated in the extreme vicinity of the refrigerant injection port 18c of the nozzle portion 18a. Thus, the shock wave has a small influence on the refrigerant pressure boosting performance of the diffuser section 18g.

Next, in the case where the gas-liquid two-phase refrigerant with the relatively high quality x (e.g., the gas-liquid two-phase refrigerant with the quality x that is higher than or equal to 0.8) flows into the nozzle portion 18a, the quality x of the refrigerant that is immediately before being injected from the refrigerant injection port 18c of the nozzle portion 18a is also high. Accordingly, compared to a case where the gas-liquid two-phase refrigerant with the relatively low quality x flows into the nozzle portion 18a, a degree of an increase in the quality x at a time that the injection refrigerant is mixed with the suction refrigerant and becomes the mixed refrigerant is reduced.

Figure 21:
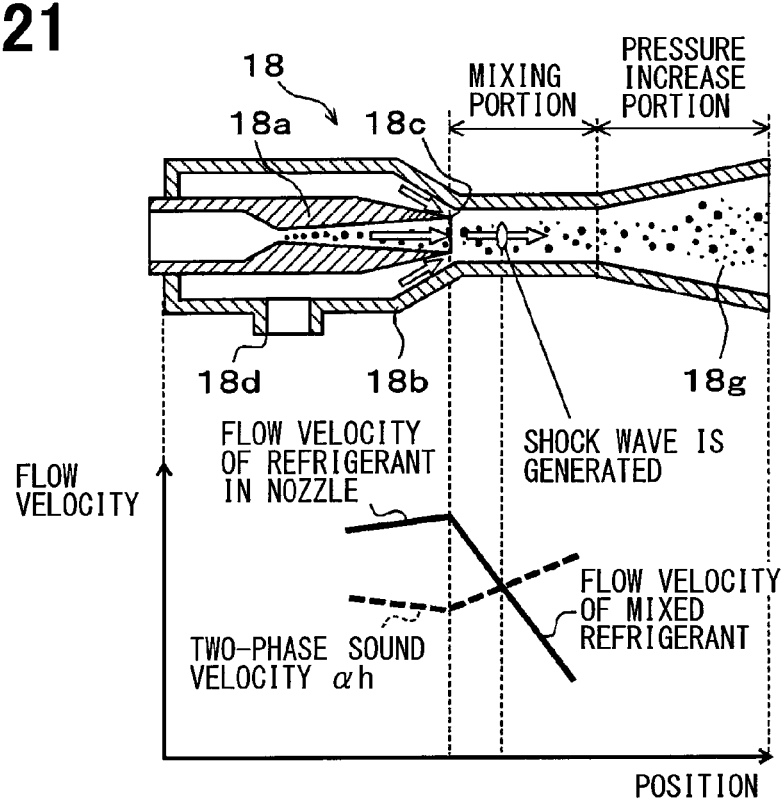
FIG. 21 is an explanatory view for explaining a position where the shock wave is generated in the ejector during an operation in which a quality of a refrigerant flowing into a nozzle portion is relatively high.

Thus, as indicated by a bold broken line in FIG. 21, a degree of an increase in the two-phase sound velocity $\alpha$h is also reduced. Compared to the case where the gas-liquid two-phase refrigerant with the relatively low quality x flows into the nozzle portion 18a, a position where a flow velocity of the mixed refrigerant has a lower value than two-phase sound velocity $\alpha$h (i.e., a position where the shock wave is generated) tends to separate from the refrigerant injection port 18c.

Then, when the position where the shock wave is generated separates from the refrigerant injection port 18c and moves to the vicinity of an inlet section of the diffuser section 18g or into the diffuser section 18g, the flow velocity of the mixed refrigerant that flows through the diffuser section 18g becomes unstable by an action of the shock wave, and the refrigerant pressure boosting performance in the diffuser section 18g becomes unstable.

As a result, the diffuser section 18g of the ejector 18 is no longer capable of exerting the desired refrigerator pressure boosting performance. In the ejector-type refrigeration cycle in Patent Literature 1, an effect in improving the COP that is achieved by including the ejector cannot be obtained sufficiently. Furthermore, according to the consideration of the inventors, it has been confirmed that the refrigerant pressure boosting performance tends to be unstable when the quality x of the mixed refrigerant is higher than or equal to 0.8 in the ejector-type refrigeration cycle in Patent Literature 1.

On the contrary, according to the ejector 18 of this embodiment, the distance La in the mixing portion 18e that is in the axial direction of the nozzle portion 18a and that is from the refrigerant injection port 18c of the nozzle portion 18a to the inlet section 18h of the diffuser section 18g is determined such that the flow velocity of the refrigerant flowing into the inlet section 18h becomes lower than or equal to the two-phase sound velocity $\alpha$h. Accordingly, the shock wave, which is generated at the time that the mixed refrigerant is shifted from the supersonic velocity state to the subsonic velocity state, can be generated in the mixing portion 18e.

Thus, the generation of the shock wave in the diffuser section 18g can be restricted, and the flow velocity of the mixed refrigerant flowing through the diffuser section 18g can be restricted from being unstable due to an action of the shock wave. As a result, even the ejector 18, which makes the refrigerant flowing out of the first evaporator 15 flow into the nozzle portion 18a, can stabilize the refrigerant pressure boosting performance in the diffuser section 18g. Thus, the deterioration of the refrigerant pressure boosting performance of the ejector 18 can be restricted.

Furthermore, the distance La is determined to satisfy the above formula F3. Thus, the shock wave, which is generated at the time that the mixed refrigerant is shifted from the supersonic velocity state to the subsonic velocity state, can be generated in the mixing portion 18e. In addition, an unnecessary increase in the axial length of the ejector 18 can be restricted.

In the ejector 18 of this embodiment, the mixing portion 18e has a shape in which the refrigerant passage area is gradually reduced toward the refrigerant flow downstream side. Furthermore, the refrigerant passage area of the inlet section 18h of the diffuser section 18g is set smaller than the refrigerant passage area of the refrigerant injection port 18c of the nozzle portion 18a.

Accordingly, in the mixing portion 18e of this embodiment, it is adapted that the flow velocity of the mixed refrigerant is effectively reduced, and the flow velocity of the mixed refrigerant becomes lower than or equal to the two-phase sound velocity αh before the mixed refrigerant reaches the inlet section 18h of the diffuser section 18g.

Moreover, according to the consideration of the inventors, it has been apparent that the flow velocity of the mixed refrigerant can effectively be reduced by setting the shape of the mixing portion 18e to have a shape that is a combination of (i) the truncated cone shape, in which the refrigerant passage area is gradually reduced toward the refrigerant flow downstream side, and (ii) the columnar shape, in which the refrigerant passage area is fixed, and by determining the distance Lb in a manner to satisfy the above formula F4.

Figure 4:
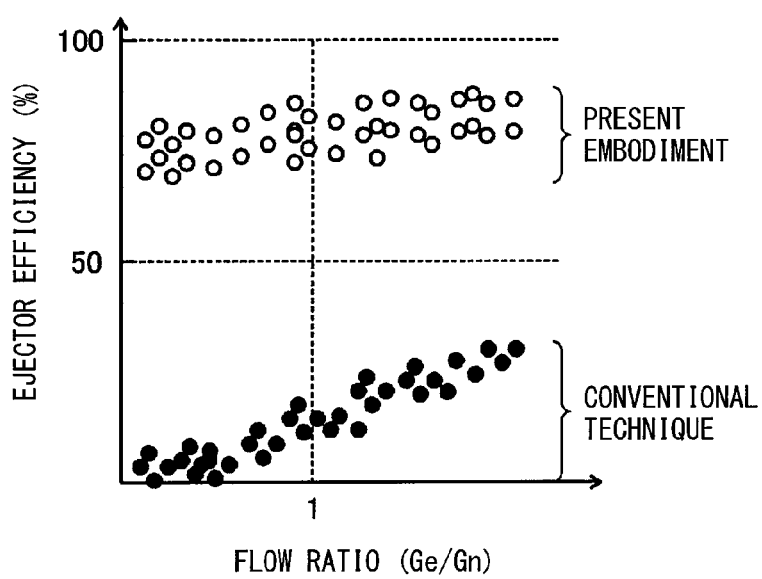
FIG. 4 is a graph that indicates ejector efficiency of the ejector of the first embodiment.

Thus, according to the ejector 18 of this embodiment, as shown in FIG. 4, energy conversion efficiency (ejector efficiency ηej) can significantly be improved in comparison with the background art. As a result, in the ejector-type refrigeration cycle 10 of this embodiment, an effect in improving the COP that is achieved by including the ejector 18 can sufficiently be obtained.

The ejector efficiency ηej is defined by the following formula F5.

$$\eta ej = \{\Delta hd \times (Gn+Ge)\}/(\Delta iej \times Gn) \quad (F5)$$

Here, Gn is a flow rate of the injection refrigerant that is injected from the nozzle portion 18a of the ejector 18 and is also a flow rate of the refrigerant that flows through the first evaporator 15. In addition, Ge is a flow rate of the suction refrigerant that is drawn from the refrigerant suction port 18d of the ejector 18, and is also a flow rate of the refrigerant that flows through the second evaporator 17.

Furthermore, as shown in FIG. 3, $\Delta hd$ is an increased amount of the enthalpy at a time that the pressure of the refrigerant is boosted in the isentropic manner in the diffuser section 18g of the ejector 18. As shown in FIG. 3, $\Delta iej$ is a reduced amount of the enthalpy at a time that the pressure of the refrigerant is reduced in the isentropic manner in the nozzle portion 18a of the ejector 18.

Second Embodiment

Figure 5:
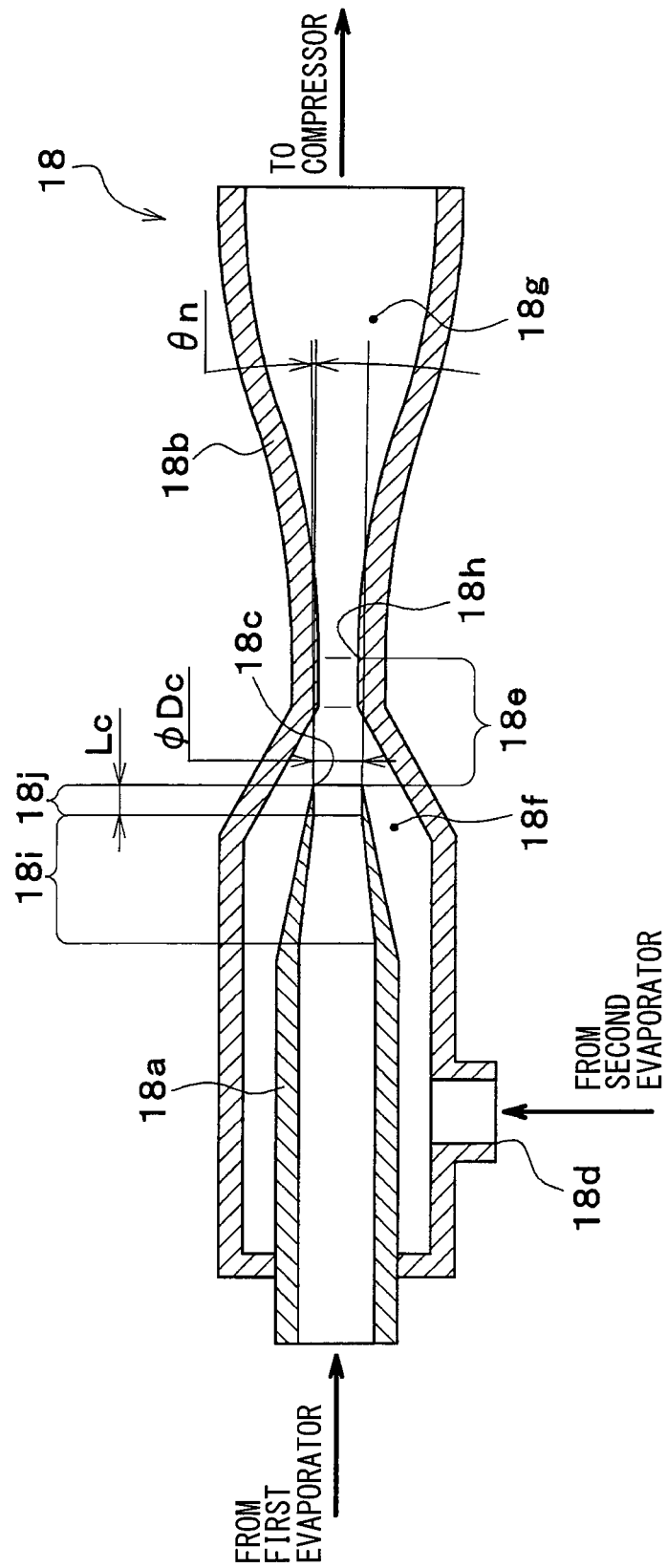
FIG. 5 is an axial cross-sectional view of an ejector of a second embodiment.

In this embodiment, a description will be made on an example in which a configuration of the ejector 18 is changed as shown in FIG. 5 from that in the first embodiment. In FIG. 5, the same or equivalent portions to those in the first embodiment are denoted by the same reference signs. This applies to the following drawings.

More specifically, in the ejector 18 of this embodiment, a tapered section 18i, in which a cross-sectional area of a refrigerant passage is gradually reduced toward the refrigerant injection port 18c, is formed as a refrigerant passage that is formed in the nozzle portion 18a. That is, the nozzle portion 18a of this embodiment is configured as a so-called tapered nozzle. Furthermore, an injecting section 18j is formed on the lowermost downstream side of the refrigerant passage that is formed in the nozzle portion 18a of this embodiment.

The injecting section 18j is a space for guiding the refrigerant from a lowermost downstream portion of the tapered section 18i toward the refrigerant injection port 18c. Accordingly, a spray shape or an expanding direction of an injection refrigerant that is injected from the refrigerant injection port 18c can be changed in accordance with an angle (i.e., an expanding angle) θn of the injecting section 18j in an axial cross section of the nozzle portion 18a. That is, the injecting section 18j can also be expressed as a space for regulating an injection direction of the refrigerant that is injected from the refrigerant injection port 18c.

The injecting section 18j is formed such that an inner diameter thereof is fixed or gradually increased toward a downstream side of a refrigerant flow. In this embodiment, the angle θn of the injecting section 18j in the axial cross section of the nozzle portion 18a is set at 0°. That is, the injecting section 18j of this embodiment is formed by a columnar space that extends in an axial direction of the nozzle portion 18a and has a fixed cross sectional area of the refrigerant passage. In FIG. 5, in order to clarify the angle θn, the angle θn is illustrated as a slight value (e.g., about 1°).

In addition, as shown in FIG. 5, in the case where, of an axial length of the refrigerant passage formed in the nozzle portion 18a, an axial length for which the injecting section 18j is formed is referred to as Lc and where a corresponding diameter of an opening area of the refrigerant injection port 18c is referred to as φDc, the distance Lc is determined to satisfy the following formula F6.

$$Lc/\phi Dc \leq 1 \quad (F6)$$

In this embodiment, more specifically, the distance Lc is determined to satisfy Lc/φDc=0.67. However, Lc may be determined to satisfy Lc/φDc=1.

In the nozzle portion 18a of this embodiment, the refrigerant passage that is formed therein is formed as described above. In this way, the refrigerant that is injected from the refrigerant injection port 18c to the mixing portion 18e is expanded freely.

Configurations and actuation of the rest of the ejector 18 and an ejector-type refrigeration cycle 10 are similar to those of the first embodiment. Thus, when the ejector-type refrigeration cycle 10 of this embodiment is actuated, similar to the first embodiment, vehicle cabin inside air that is blown into a vehicle cabin and box inside air that is circulated and blown into a cool box can be cooled.

According to the configuration of the ejector-type refrigeration cycle 10 of this embodiment, the gas-phase refrigerant, which is after flowing out of the first evaporator 15 and has the overheat degree, flows into the nozzle portion 18a of the ejector 18. In such a configuration, the flow velocity of the refrigerant that is immediately before being injected from the refrigerant injection port tends to be high, and the diffuser section 18g of the ejector 18 is possibly incapable of exerting the desired refrigerant pressure boosting performance.

In detail, in the general ejector, loss of the kinetic energy at the time that the refrigerant is decompressed in the nozzle portion is recovered by suctioning the refrigerant from a refrigerant suction port by the suction action of the injection refrigerant. At this time, a recovered energy amount (that is, a reduced amount of the enthalpy indicated by $\Delta iej$ in FIG. 3) is increased in conjunction with the increase in the enthalpy of the refrigerant that flows into the nozzle portion in the case where the pressure of the refrigerant that flows into the nozzle portion is fixed.

In addition, a maximum value of a flow velocity V of the injection refrigerant that is immediately after being injected from the refrigerant injection port of the nozzle portion is expressed by the following formula F7.

$$V = V0 + (2 \times \Delta iej)^{0.5} \quad (F7)$$

V0 is an initial velocity of the refrigerant that flows into the nozzle portion.

Accordingly, the gas-phase refrigerant, the enthalpy of which is higher than that of the gas-liquid two-phase refrigerant, flows into the nozzle portion, the flow velocity V of the injection refrigerant tends to be increased, and the wall surface friction between the refrigerant and the refrigerant passage provided in the nozzle portion also tends to be increased.

Furthermore, when the gas-phase refrigerant that flows through the refrigerant passage provided in the nozzle portion at a high velocity is condensed and becomes the gas-liquid two-phase refrigerant with a high gas-liquid density ratio (e.g., the gas-liquid two-phase refrigerant with the gas-liquid density ratio that is higher than or equal to 200), the wall surface friction between the refrigerant and the refrigerant passage is significantly increased and leads to the loss of kinetic energy of the refrigerant. Such loss of kinetic energy reduces the flow velocity of the injection refrigerant, and further deteriorates the refrigerant pressure boosting performance in the diffuser section.

On the contrary, according to the ejector 18 of this embodiment, the injecting section 18j is provided in the nozzle portion 18a that is constituted as the tapered nozzle, and the mixed refrigerant that is injected from the refrigerant injection port 18c to the mixing portion 18e is expanded freely. Thus, the injection refrigerant can be accelerated without providing a flare section as in a de Laval nozzle. That is, the refrigerant can be accelerated without generating the wall surface friction between the refrigerant and the refrigerant passage that is generated when the refrigerant is accelerated to have a supersonic velocity in the flare section of the de Laval nozzle.

Thus, the loss of the kinetic energy of the refrigerant that flows through the refrigerant passage can be restricted by reducing the wall surface friction between the refrigerant and the refrigerant passage, and the reduction in the flow velocity of the injection refrigerant can be restricted. As a result, the ejector 18, which makes the refrigerant flowing out of the first evaporator 15 flow into the nozzle portion 18a, can restrict deterioration of the refrigerant pressure boosting performance of the ejector 18 by reducing the loss of the kinetic energy of the refrigerant in the nozzle portion 18a.

In addition, according to the ejector 18 of this embodiment, similar to the first embodiment, the refrigerant pressure boosting performance in the diffuser section 18g can be stabilized, and ejector efficiency ηej in the ejector 18 can be improved. Thus, in the ejector-type refrigeration cycle 10 of this embodiment, an effect in improving a COP that is achieved by including the ejector 18 can sufficiently be obtained.

In this embodiment, the description has been made on the example in which the expanding angle θn of the injecting section 18j in the axial cross section of the nozzle portion 18a is set at 0°. However, the angle θn can be set larger than 0° as long as the refrigerant that is injected from the refrigerant injection port 18c can be expanded freely. That is, the injecting section 18j may be formed by a truncated cone shaped space, an inner diameter of which is gradually increased toward a downstream direction of the refrigerant flow.

Third Embodiment

Figure 6:
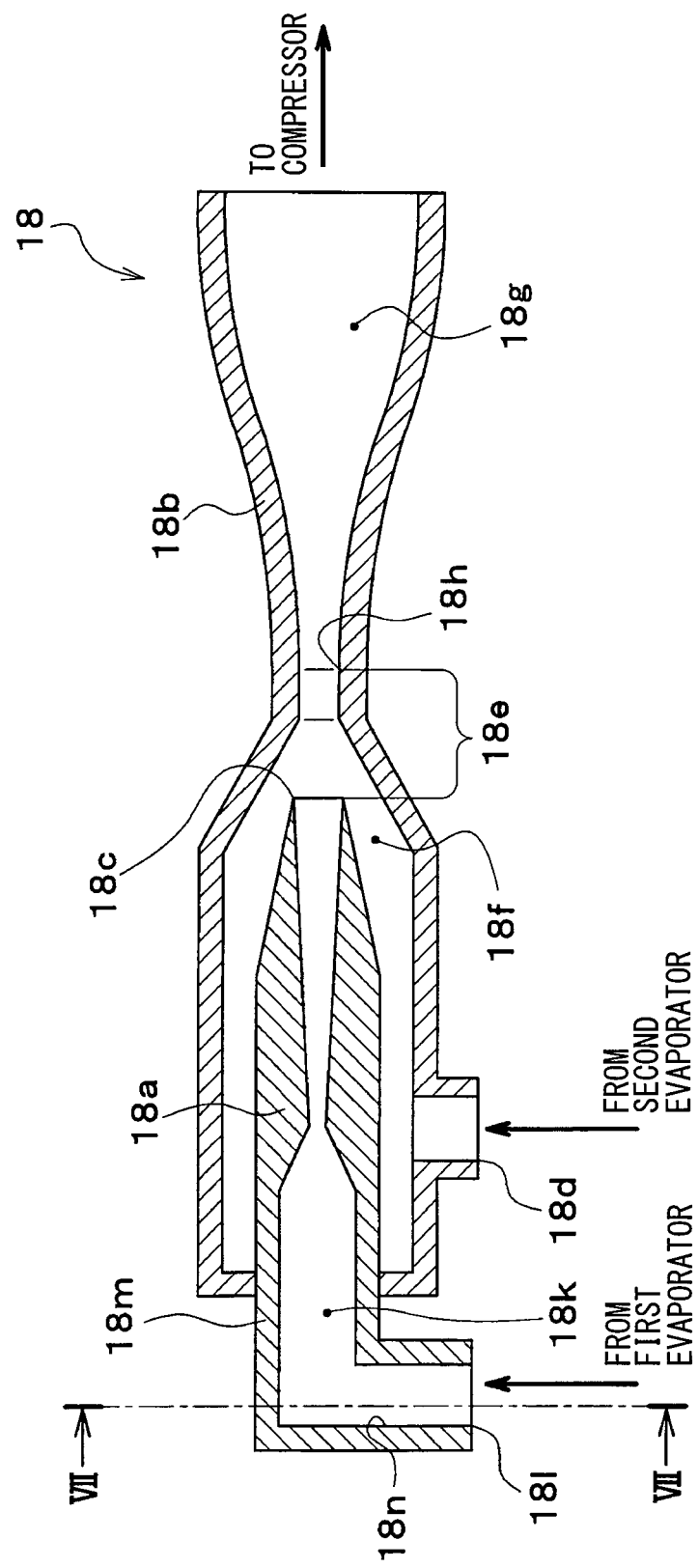
FIG. 6 is an axial cross-sectional view of an ejector of a third embodiment.
Figure 7:
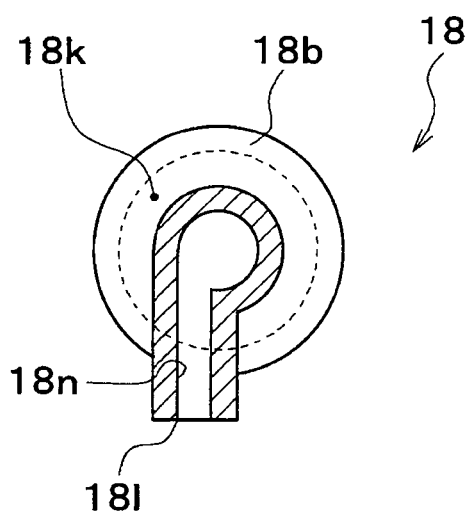
FIG. 7 is a cross-sectional view taken along VII-VII in FIG. 6.

In this embodiment, a description will be made on an example in which a configuration of the ejector 18 is changed from that in the first embodiment as shown in FIG. 6, FIG. 7. More specifically, in the ejector 18 of this embodiment, a swirl space 18k in which a refrigerant flowing thereinto from a refrigerant inflow port 18l swirls around an axis of the nozzle portion 18a is provided on a refrigerant flow upstream side of a throat section (i.e., a minimum passage area section) of a refrigerant passage that is formed in the nozzle portion 18a.

In detail, the swirl space 18k is formed on the inside of a cylindrical section 18m that is provided on the refrigerant flow upstream side in the nozzle portion 18a. The cylindrical section 18m constitutes a swirl space forming member. Thus, in this embodiment, the swirl space forming member and the nozzle portion are integrally configured.

The swirl space 18k is formed in a rotational body shape, and a center axis thereof extends in a coaxial manner with the nozzle portion 18a. The rotational body shape is a stereoscopic shape that is formed when a plane figure is rotated about a straight line (i.e., a center axis) on the same plane. More specifically, the swirl space 18k of this embodiment is formed in a substantially columnar shape.

Furthermore, a refrigerant inflow passage 18n that connects between the refrigerant inflow port 18l and the swirl space 18k extends in a tangential direction of an inner wall surface of the swirl space 18k as shown in FIG. 7 when seen in a direction of the center axis of the swirl space 18k. Accordingly, the refrigerant flowing into the swirl space 18k from the refrigerant inflow port 18l flows along the inner wall surface of the swirl space 18k and swirls in the swirl space 18k.

Here, a centrifugal force acts on the refrigerant that swirls in the swirl space 18k. Thus, in the swirl space 18k, refrigerant pressure on the center axis side becomes lower than the refrigerant pressure on an outer circumferential side. For this reason, in this embodiment, the refrigerant pressure on the center axis side in the swirl space 18k is reduced during a normal operation such that the refrigerant on the center axis side in the swirl space 18k is on a gas-liquid two-phase side from a saturated gas line, that is, such that the refrigerant on the center axis side in the swirl space 18k starts being condensed.

Such adjustment of the refrigerant pressure on the center axis side in the swirl space 18k can be realized by adjusting a swirling flow velocity of the refrigerant that swirls in the swirl space 18k. Furthermore, adjustment of the swirling flow velocity can be performed, for example, by adjusting a ratio of a flow passage cross-sectional area between a passage cross-sectional area of the refrigerant inflow passage 18n and a cross-sectional area of the swirl space 18k that is perpendicular to the axial direction, or by adjusting an throttle opening degree of the high-stage-side throttle device 13 that is arranged on an upstream side of the nozzle portion 18a.

Configurations and actuation of the other ejector 18 and the ejector-type refrigeration cycle 10 are similar to those of the first embodiment. Thus, when the ejector-type refrigeration cycle 10 of this embodiment is actuated, similar to the first embodiment, vehicle cabin inside air that is blown into a vehicle cabin and box inside air that is circulated and blown into a cool box can be cooled.

Here, in a configuration that a gas-phase refrigerant, which is after flowing out of the first evaporator 15 and has an overheat degree, flows into the nozzle portion 18a of the ejector 18 as in the ejector-type refrigeration cycle 10 of this embodiment, as described above, the refrigerant is condensed and accelerated while being decompressed in the refrigerant passage formed in the nozzle portion 18a of the ejector 18.

In such an ejector 18, as described above, not only the energy loss possibly occurs due to wall surface friction between the refrigerant and the refrigerant passage, but also a condensation delay possibly occurs when the gas-phase refrigerant that flows through the refrigerant passage formed in the nozzle portion 18a is condensed. In this way, the refrigerant pressure boosting performance in the diffuser section 18g is degraded.

On the contrary, in the ejector 18 of this embodiment, the refrigerant swirls in the swirl space 18k. Accordingly, the condensation of the refrigerant is started by reducing the pressure thereof on the swirling center axis side in the swirl space 18k, and the gas-liquid two-phase refrigerant in which a condensation nucleus is generated can flow into the nozzle portion 18a. Accordingly, the occurrence of the condensation delay in the refrigerant in the nozzle portion 18a can be restricted.

Figure 8:
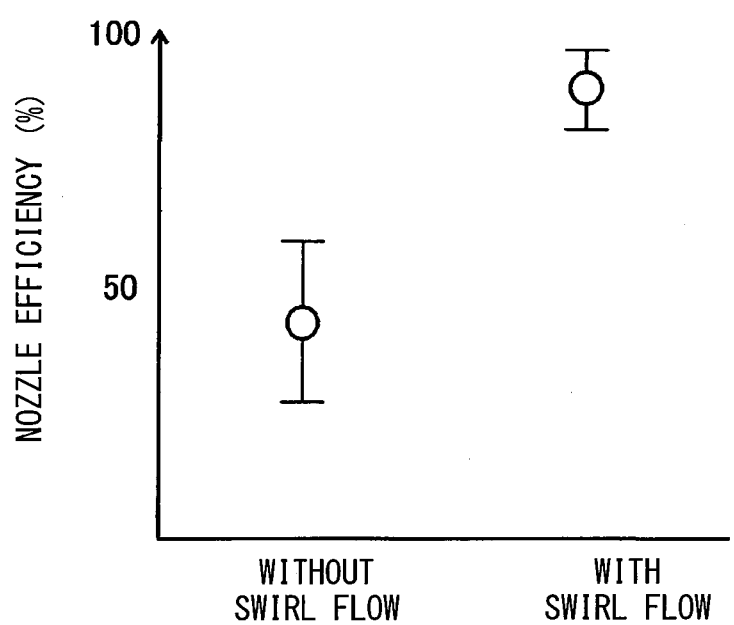
FIG. 8 is a graph that indicates nozzle efficiency of the ejector of the third embodiment.

As a result, as shown in FIG. 8, nozzle efficiency ηnoz in the nozzle portion 18a can significantly be improved in comparison with the background art. Furthermore, in the ejector 18 that condenses and accelerates the refrigerant while reducing the pressure thereof in the refrigerant passage formed in the nozzle portion 18a, the deterioration of the refrigerant pressure boosting performance in the diffuser section 18g can be restricted. The nozzle efficiency ηnoz is energy conversion efficiency at a time that pressure energy of the refrigerant is converted to kinetic energy in the nozzle portion 18a.

In addition, according to the ejector 18 of this embodiment, similar to that of the first embodiment, the refrigerant pressure boosting performance in the diffuser section 18g can be stabilized, and ejector efficiency ηej in the ejector 18 can be improved. Thus, in the ejector-type refrigeration cycle 10 of this embodiment, an effect in improving a COP that is achieved by including the ejector 18 can sufficiently be obtained.

Furthermore, according to the ejector 18 of this embodiment, even in the case where the refrigerant that flows into the swirl space 18k is the gas-liquid two-phase refrigerant, boiling of the refrigerant that flows into the throat section (i.e., the minimum passage cross-sectional area section) of the nozzle portion 18a can be promoted by reducing the refrigerant pressure on the center axis side in the swirl space 18k. Thus, the nozzle efficiency ηnoz can be improved.

Fourth Embodiment

In this embodiment, a description will be made on an example in which a configuration of an ejector-type refrigeration cycle is changed from that in the first embodiment.

Figure 9:
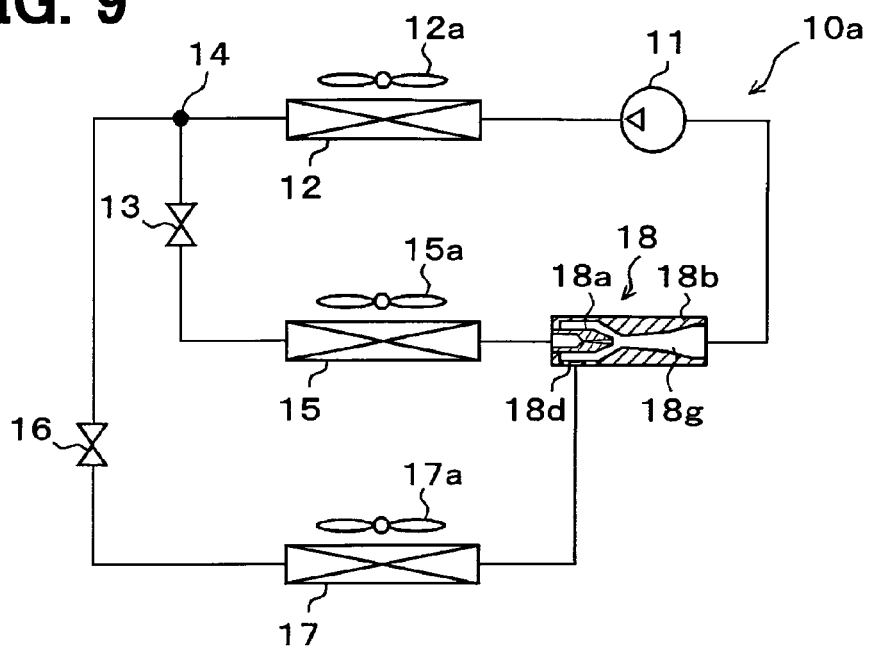
FIG. 9 is an overall configuration diagram of an ejector-type refrigeration cycle of a fourth embodiment.

More specifically, in an ejector-type refrigeration cycle 10a of this embodiment, as shown in FIG. 9, the branch section 14 is arranged on an outlet side of the heat radiator 12. One of refrigerants branched in the branch section 14 is decompressed in a high-stage-side throttle device 13 until the refrigerant becomes a low-pressure refrigerant, and the refrigerant flows into a refrigerant inlet side of the first evaporator 15. In addition, the other of the refrigerants branched in the branch section 14 is decompressed in the low-stage-side throttle device 16 until the refrigerant becomes the low-pressure refrigerant, and the refrigerant flows into a refrigerant inlet side of the second evaporator 17.

Furthermore, in this embodiment, a throttle opening degree of the low-stage-side throttle device 16 is set smaller than a throttle opening degree of the high-stage-side throttle device 13, and a decompression amount in the low-stage-side throttle device 16 is larger than a decompression amount in the high-stage-side throttle device 13. Accordingly, refrigerant evaporating pressure (i.e., a refrigerant evaporating temperature) in the second evaporator 17 is lower than the refrigerant evaporating pressure (i.e., the refrigerant evaporating temperature) in the first evaporator 15. The rest of the configuration is the same as that in the first embodiment.

Figure 10:
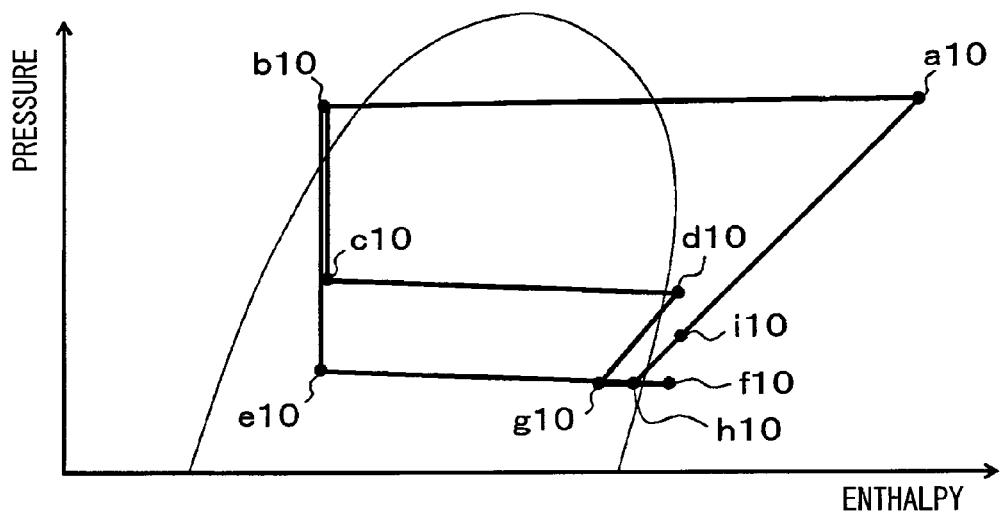
FIG. 10 is a Molier diagram that depicts a state of a refrigerant at a time that the ejector-type refrigeration cycle of the fourth embodiment is actuated.

Thus, as shown in a Molier diagram in FIG. 10, when the ejector-type refrigeration cycle 10a of this embodiment is actuated, a gas-phase refrigerant, which is discharged from the compressor 11 and is in a high-temperature high-pressure state (refer a point a10 in FIG. 10), radiates heat and is condensed in the heat radiator 12 (refer the point a10→a point b10 in FIG. 10), similar to the first embodiment.

A flow of the refrigerant flowing out of the heat radiator 12 is branched in the branch section 14. The one of the refrigerants branched in the branch section 14 is decompressed in the high-stage-side throttle device 13 (refer the point b10→a point c10 in FIG. 10), and the refrigerant flows into the first evaporator 15. The other of the refrigerants branched in the branch section 14 is decompressed in the low-stage-side throttle device 16 (refer the point b10→a point e10 in FIG. 10), and the refrigerant flows into the second evaporator 17. The actuation onward is similar to that in the first embodiment.

Thus, when the ejector-type refrigeration cycle 10a of this embodiment is actuated, similar to the first embodiment, vehicle cabin inside air that is blown into a vehicle cabin and box inside air that is circulated and blown into a cool box can be cooled.

Furthermore, also in the ejector-type refrigeration cycle 10a of this embodiment, the ejector 18 exerts similar effects as those in the first embodiment. Thus, an effect in improving a COP by including the ejector 18 can sufficiently be obtained. Moreover, the ejector 18 that is disclosed in any of the second, the third, an eighth, and a ninth embodiments can be adopted in the ejector-type refrigeration cycle 10a of this embodiment.

Fifth Embodiment

In this embodiment, a description will be made on an example in which a configuration of an ejector-type refrigeration cycle is changed from that in the first embodiment.

Figure 11:
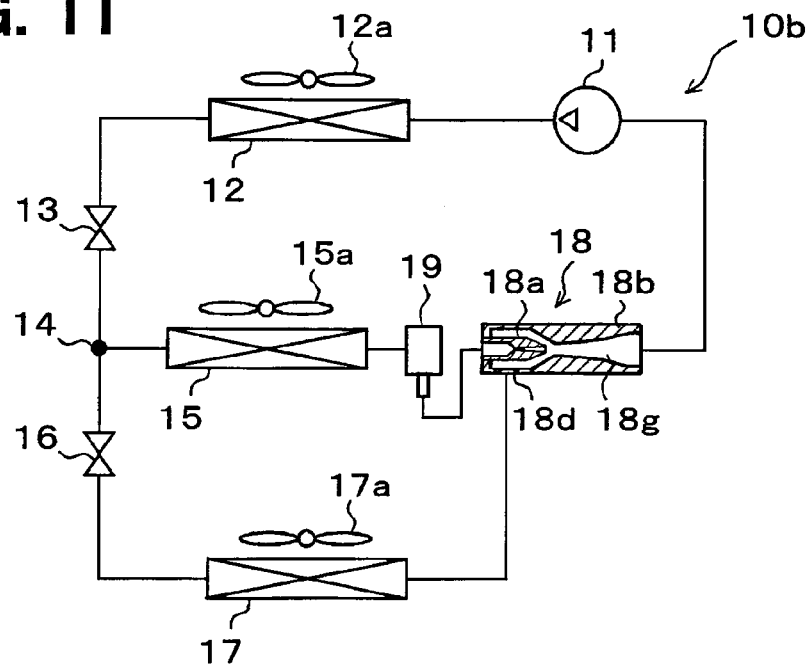
FIG. 11 is an overall configuration diagram of an ejector-type refrigeration cycle of a fifth embodiment.

More specifically, in an ejector-type refrigeration cycle 10b of this embodiment, as shown in FIG. 11, a fixed throttle, a throttle opening degree of which is fixed, is adopted as the high-stage-side throttle device 13, and a thermal expansion valve is adopted as the low-stage-side throttle device 16. Furthermore, a liquid storage tank (i.e., a liquid storage section) 19 that stores a surplus refrigerant in the cycle is arranged between a refrigerant outlet side of the first evaporator 15 and an inlet side of the nozzle portion 18a of the ejector 18.

Figure 12:
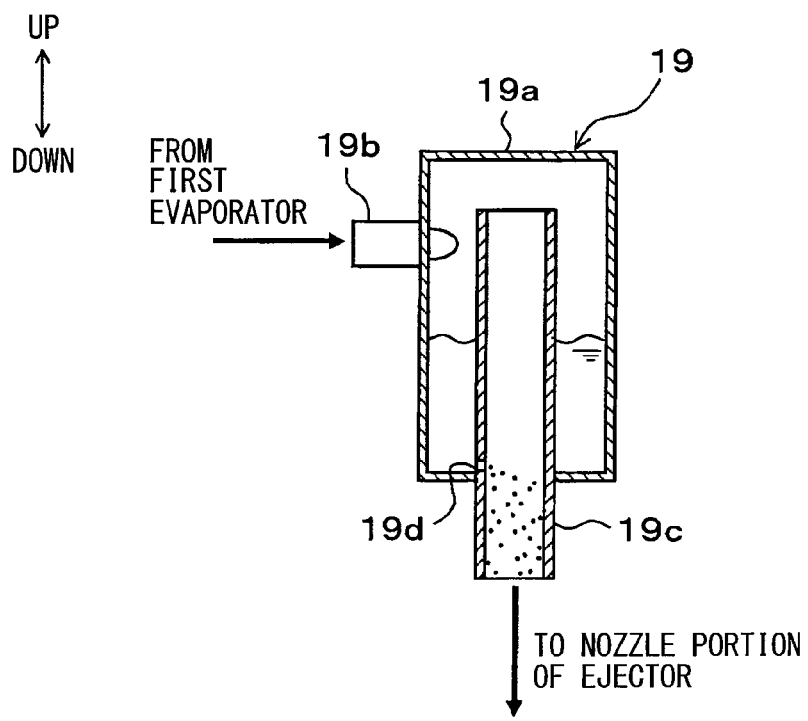
FIG. 12 is a cross-sectional view of a liquid storage tank of the fifth embodiment.

A detailed configuration of the liquid storage tank 19 will be described by using FIG. 12. Each of up and down arrows in FIG. 12 indicates each of up and down directions in a state that the liquid storage tank 19 is mounted in a vehicle.

The liquid storage tank 19 is configured by including a main body portion 19a, a refrigerant inflow port 19b, a refrigerant outflow port 19c, and the like. The main body portion 19a is formed by a cylindrical member that extends in an up-down direction and both ends of which are closed. The refrigerant inflow port 19b makes a refrigerant flowing out of the first evaporator 15 flow into the main body portion 19a. The refrigerant outflow port 19c makes a gas-liquid two-phase refrigerant flow out from the inside of the main body portion 19a to the nozzle portion 18a side of the ejector 18.

The refrigerant inflow port 19b is connected to a cylindrical side surface of the main body portion 19a, and is constructed of a refrigerant pipe that extends in a tangential direction of the cylindrical side surface of the main body portion 19a. The refrigerant outflow port 19c is connected to an axial-lower-side end surface (i.e., a bottom surface) of the main body portion 19a, and is constructed of a refrigerant pipe that extends across the inside and the outside of the main body portion 19a in a coaxial manner with the main body portion 19a.

Furthermore, an upper end of the refrigerant outflow port 19c extends to an upper side than a connected portion of the refrigerant inflow port 19b. Moreover, a liquid-phase refrigerant introducing hole 19d that makes a liquid-phase refrigerant stored in the main body portion 19a flow into the refrigerant outflow port 19c is formed on a lower side of the refrigerant outflow port 19c.

Accordingly, in an operating condition in which a flow rate of a circulating refrigerant that circulates through the cycle is reduced and the gas-liquid two-phase refrigerant flows out from the first evaporator 15, the refrigerant flowing into the main body portion 19a from the refrigerant inflow port 19b flows while swirling along a cylindrical inner wall surface of the main body portion 19a. A liquid-phase refrigerant and a gas-phase refrigerant of the refrigerant are separated by an action of a centrifugal force that is generated by a swirl flow.

Then, the separated liquid-phase refrigerant falls to the lower side by an action of gravity and is stored in the main body portion 19a as the surplus refrigerant. Meanwhile, the separated gas-phase refrigerant is mixed with the liquid-phase refrigerant, which is after flowing into the refrigerant outflow port 19c from the liquid-phase refrigerant introducing hole 19d, when flowing out to the inlet side of the nozzle portion 18a via the refrigerant outflow port 19c, and flows out as the gas-liquid two-phase refrigerant.

In addition, in an operating condition in which the flow rate of the circulating refrigerant that circulates through the cycle is increased and the gas-phase refrigerant flows out from the first evaporator 15, the gas-phase refrigerant flowing from the refrigerant inflow port 19b flows into the inlet side of the nozzle portion 18a via the refrigerant outflow port 19c without being separated into the liquid-phase refrigerant and the gas-phase refrigerant. At this time, the gas-phase refrigerant flowing into the refrigerant outflow port 19c is mixed with the liquid-phase refrigerant, which is after flowing into the refrigerant outflow port 19c from the liquid-phase refrigerant introducing hole 19d, and flows out therefrom as the gas-liquid two-phase refrigerant.

That is, the liquid storage tank 19 of this embodiment constitutes a gas-liquid supply section that makes the refrigerant flowing out of the first evaporator 15 flow out in a gas-liquid two-phase state to the inlet side of the nozzle portion 18a. More specifically, the liquid storage tank 19 mixes the liquid-phase refrigerant stored in the main body portion 19a and the refrigerant flowing out of the first evaporator 15 and makes the refrigerant flow out to the inlet side of the nozzle portion 18a.

Configurations and actuation of the other ejector 18 and the ejector-type refrigeration cycle 10b are similar to those of the first embodiment. Thus, when the ejector-type refrigeration cycle 10b of this embodiment is actuated, similar to the first embodiment, vehicle cabin inside air that is blown into a vehicle cabin and box inside air that is circulated and blown into a cool box can be cooled.

Here, in the ejector-type refrigeration cycle that is configured to make the gas-phase refrigerant flow into the nozzle portion 18a of the ejector 18, a quality x of a mixed refrigerant in which an injection refrigerant and a suction refrigerant are mixed in the mixing portion 18e tends to have a relatively high value (e.g., the quality x is higher than or equal to 0.8).

In such an ejector-type refrigeration cycle, as described by using FIG. 25, a condensation delay occurs, and refrigerant pressure boosting performance in the diffuser section 18g is possibly deteriorated. In addition, as described by using FIG. 20, FIG. 21, the refrigerant pressure boosting performance in the diffuser section 18g possibly becomes unstable.

Furthermore, according to the consideration of the inventors, in the case where the quality x of the mixed refrigerant is increased and the mixed refrigerant becomes the gas-liquid two-phase refrigerant with the high quality that is higher than or equal to 0.995, not only the diffuser section 18g of the ejector 18 is incapable of exerting the desired refrigerant pressure boosting performance, but also a flow rate of the suction refrigerant that is drawn from the refrigerant suction port 18d of the ejector 18 is possibly reduced.

A reason for the above is because a shearing force that the liquid-phase refrigerant in the mixed refrigerant receives from the gas-phase refrigerant is increased in the gas-liquid two-phase refrigerant with the high quality, and thus an average particle diameter of droplets (particles of the liquid-phase refrigerant) in the mixed refrigerant is reduced.

Figure 22:
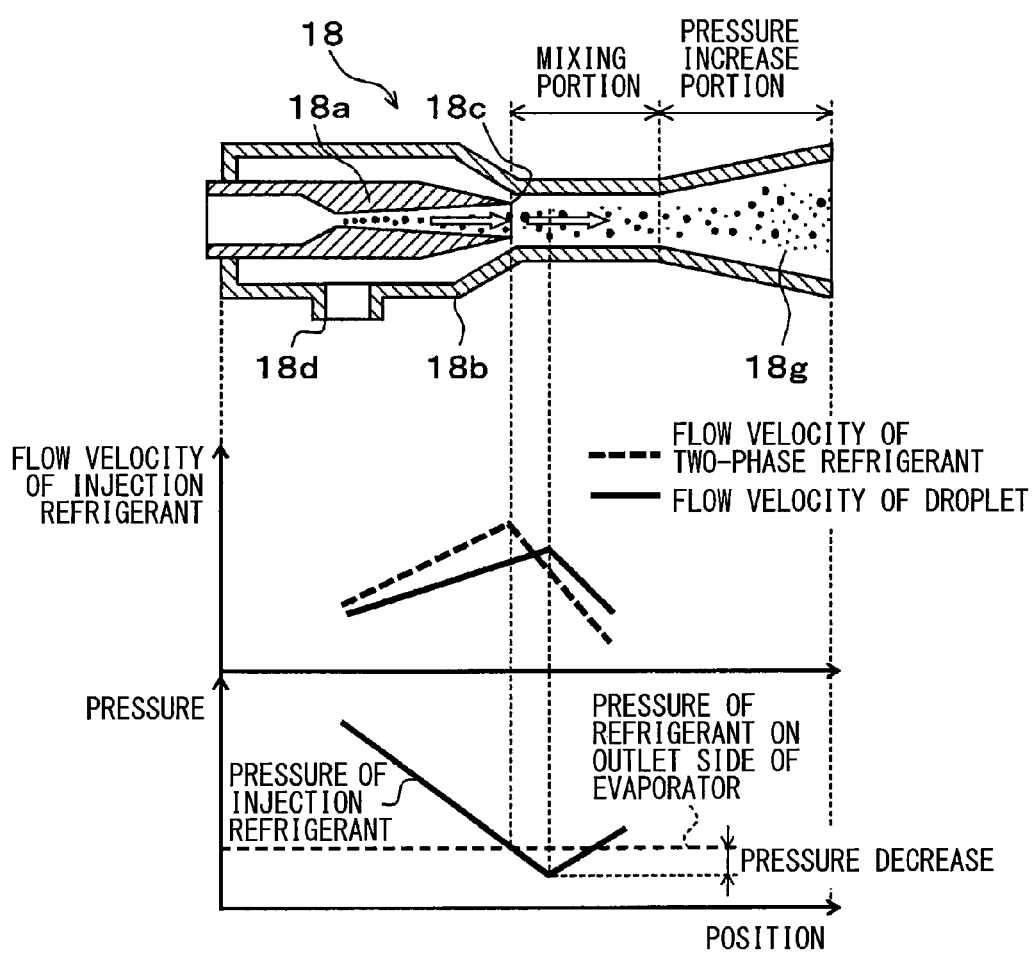
FIG. 22 is an explanatory view for explaining a pressure change of a mixed refrigerant during an operation of the general ejector-type refrigeration cycle.
Figure 23:
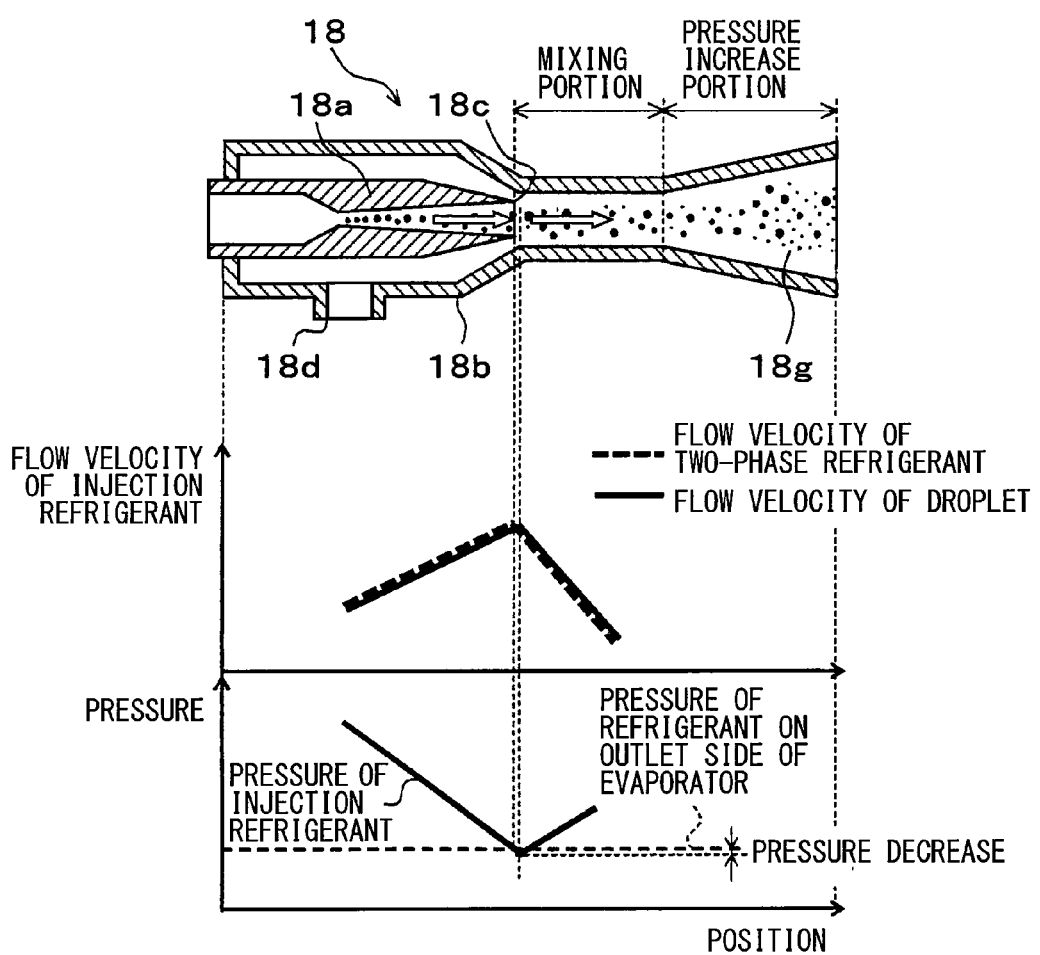
FIG. 23 is an explanatory view for explaining a pressure change of the mixed refrigerant during an operation in which the quality of the refrigerant flowing into the nozzle portion is relatively high.

A cause of a reduction in a suction refrigerant flow rate in the ejector due to the reduced average particle diameter of the droplets in the mixed refrigerant will be described by using FIG. 22, FIG. 23. In FIG. 22, FIG. 23, similar to FIG. 20, FIG. 21 described above, an axial cross section of a general ejector is schematically shown.

First, when the gas-liquid two-phase refrigerant, the quality of which has not yet become high, flows into the nozzle portion 18a of the ejector 18, the gas-phase refrigerant in the injection refrigerant decelerates while being mixed with the suction refrigerant. Meanwhile, regarding the liquid-phase refrigerant (that is, the droplets) in the injection refrigerant accelerates by an inertia force at a time that the liquid-phase refrigerant is injected from the refrigerant injection port 18c of the nozzle portion 18a. The inertia force of the droplet is expressed by an integrated value of a weight of the droplet and a velocity of the droplet in the refrigerant injection port 18c.

Since the droplet is accelerated as described above, pressure energy of the mixed refrigerant (gas-liquid mixed refrigerant) is converted to velocity energy. As indicated by a solid line in a graph on a lower side in FIG. 22, the mixed refrigerant can be decompressed to have a lower pressure than that of the refrigerant flowing out of an evaporator connected to the refrigerant suction port 18d. Furthermore, the gas-phase refrigerant flowing out of the evaporator can be drawn due to the decompression of the mixed refrigerant.

By the way, when the gas-liquid two-phase refrigerant with the high quality flows into the nozzle portion 18a of the ejector 18, not only a magnitude of resistance that the droplet in the mixed refrigerant receives from the gas-phase refrigerant is increased, but also the average particle diameter of the droplets is reduced and the weight of the droplet is reduced. Thus, the inertia force of the droplet is also reduced.

Accordingly, the velocity of the droplet at a time that the gas-liquid two-phase refrigerant with the high quality flows into the nozzle portion 18a is changed to become substantially equivalent to that of the gas-phase refrigerant. Thus, the velocity of the droplet in the mixed refrigerant cannot be increased sufficiently, and, as indicated by a solid line in a graph on a lower side in FIG. 23, the mixed refrigerant is less likely to be decompressed. As a result, the suction refrigerant flow rate of the ejector 18 is reduced.

Furthermore, in a region where the mixed refrigerant becomes the gas-phase refrigerant and a refrigerant passage cross-sectional area in the mixing portion 18e does not change, an expansion wave that is generated at a time that the injection refrigerant is injected from the refrigerant injection port 18c collides with a compression wave that is generated when the injection refrigerant and the suction refrigerant merge. In this way, multiple periodical shock waves called barrel shock waves as shown in FIG. 24 are possibly generated in the mixed refrigerant.

Such a barrel shock wave periodically changes the flow velocity of the mixed refrigerant from a supersonic velocity state to a subsonic velocity state, and further from the subsonic velocity state to the supersonic velocity state. Accordingly, the velocity energy of the mixed refrigerant is significantly lost. Thus, the barrel shock wave can be a cause of significantly reducing the suction refrigerant flow rate of the ejector 18 or a cause of generating large actuation sound in the ejector 18.

Figure 24:
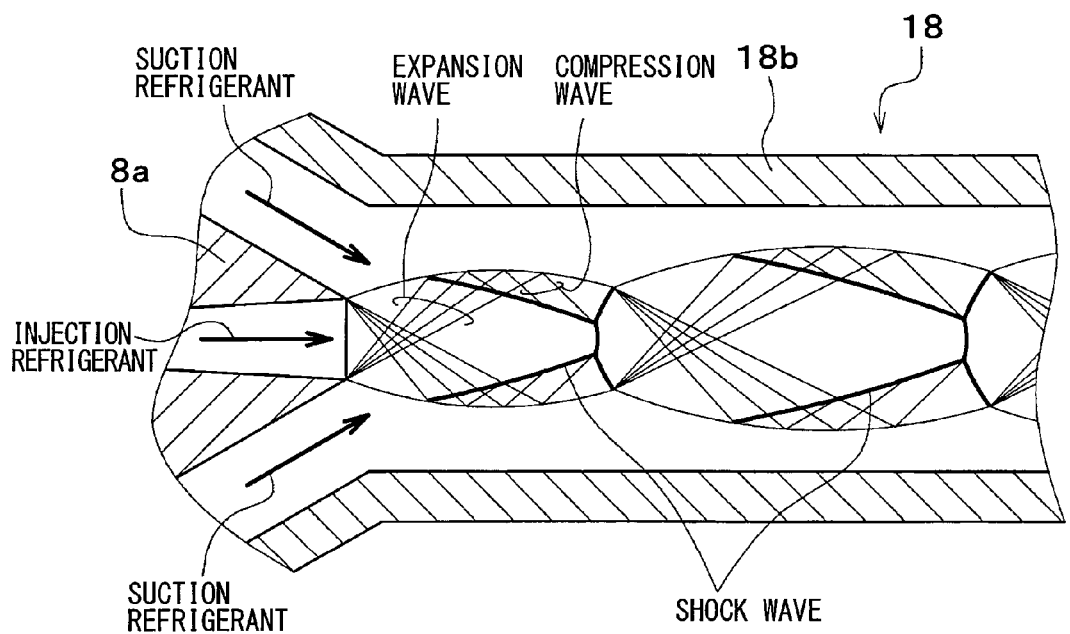
FIG. 24 is an explanatory view for explaining a barrel shock wave.

FIG. 24 is an explanatory view for explaining the barrel shock wave, and is an enlarged schematic cross-sectional view of a periphery of the refrigerant injection port 18c of the nozzle portion 18a in the ejector 18 of the existing art.

On the contrary, the ejector-type refrigerant cycle 10b of this embodiment includes the liquid storage tank 19 as the gas-liquid supply section. Thus, the gas-liquid two-phase refrigerant can reliably flow into the nozzle portion 18a of the ejector 18. Therefore, the occurrence of the condensation delay can reliably be restricted.

Furthermore, the gas-liquid two-phase refrigerant flows into the nozzle portion 18a and is decompressed in an isentropic manner. For this reason, the injection refrigerant also reliably becomes the gas-liquid two-phase refrigerant. Thus, an increase in the quality x of the mixed refrigerant can be restricted. Therefore, the refrigerant pressure boosting performance in the diffuser section 18g can be restricted from being unstable, and the suction refrigerant flow rate of the ejector 18 can be restricted from being reduced.

In addition to the above, a two-phase sound velocity αh of the mixed refrigerant can be reduced by reducing the quality x of the injection refrigerant. Accordingly, the shock wave that is generated at the time that the flow velocity of the gas-liquid two-phase refrigerant is shifted from the supersonic velocity state to the subsonic velocity state can be a weak shock wave in terms of gas dynamics. Thus, the refrigerant pressure boosting performance in the diffuser section 18g can effectively be restricted from becoming unstable.

As a result, according to the ejector-type refrigeration cycle 10b of this embodiment, even in the configuration that the downstream-side refrigerant of the first evaporator 15 flows into the nozzle portion 18a of the ejector 18, a COP can sufficiently be improved.

In this embodiment, the gas-liquid supply section is constructed of the liquid storage tank 19. Thus, the configuration of the cycle is restricted from being complicated, and the gas-liquid two-phase refrigerant can reliably flow into the nozzle portion 18a of the ejector 18 in an extremely simple configuration.

In the ejector-type refrigeration cycle 10b of this embodiment, it is adapted that the thermal expansion valve as a variable throttle mechanism is adopted as the low-stage-side throttle device 16, and the refrigerant flowing out of the second evaporator 17 falls within a predetermined reference range. In other words, a throttle opening degree of the low-stage-side throttle device 16 of this embodiment is adjusted such that the refrigerant flowing out of the second evaporator 17 has over heat degree that is lower than or equal to a predetermined reference overheat degree.

Accordingly, by appropriately setting the reference overheat degree, the increase in the quality x of the mixed refrigerant can reliably be restricted, the injection refrigerant in the gas-liquid two-phase state and the suction refrigerant in the gas-phase state, the overheat degree of which is lower than the reference overheat degree, being mixed in the mixed refrigerant. Furthermore, the throttle opening degree of the low-stage-side throttle device 16 may be adjusted such that the refrigerant flowing out of the second evaporator 17 becomes a saturated gas-phase refrigerant or the gas-liquid two-phase refrigerant.

In addition, according to the ejector 18 of this embodiment, similar to that of the first embodiment, the refrigerant pressure boosting performance in the diffuser section 18g can be stabilized, and ejector efficiency ηej in the ejector 18 can be improved. As a result, according to the ejector-type refrigeration cycle 10b of this embodiment, an effect in improving the COP that is achieved by including the ejector 18 can sufficiently be obtained.

Moreover, the ejector 18 that is disclosed in any of the second, the third, the eighth, and the ninth embodiments can be adopted in the ejector-type refrigeration cycle 10b of this embodiment.

Sixth Embodiment

Figure 13:
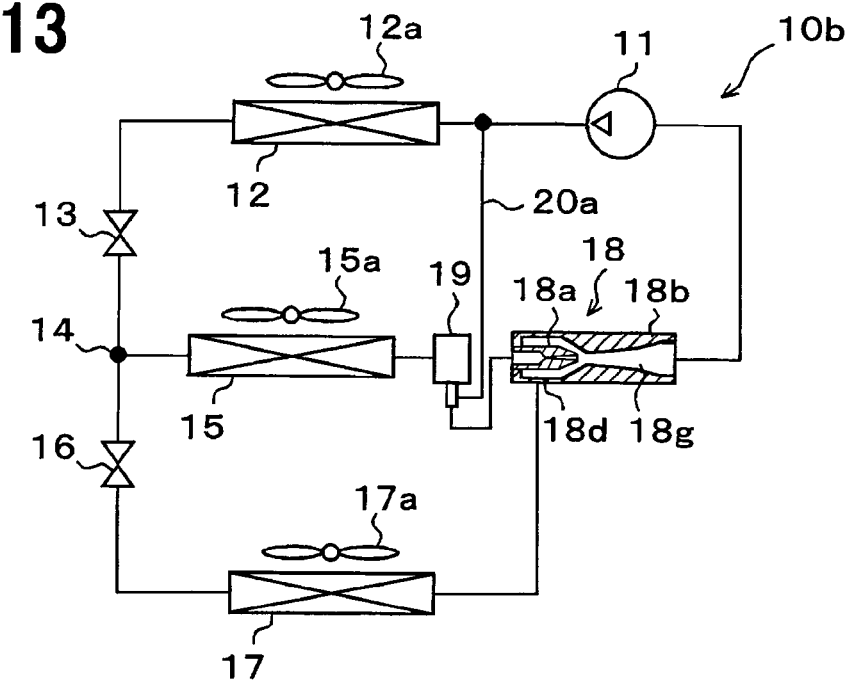
FIG. 13 is an overall configuration diagram of an ejector-type refrigeration cycle of a sixth embodiment.

In this embodiment, a description will be made on an example in which a configuration of an ejector-type refrigeration cycle is changed from that in the fifth embodiment as shown in FIG. 13.

More specifically, in the ejector-type refrigeration cycle 10b of this embodiment, a discharged refrigerant passage 20a that guides a gas-phase refrigerant discharged from the compressor 11 into the liquid storage tank 19 is added. The discharged refrigerant passage 20a is desirably provided with a throttle section for preventing an increase in refrigerant pressure in the liquid storage tank 19. Accordingly, in this embodiment, the discharged refrigerant passage 20a is constructed of a capillary tube.

Thus, the liquid storage tank 19 that is a gas-liquid supply section of this embodiment is configured to mix a liquid-phase refrigerant stored in the liquid storage tank 19 and a gas-phase refrigerant discharged from the compressor 11 and to make the mixed refrigerant flow out to an inlet side of a nozzle portion 18a. The rest of the configuration and actuation are the same as those in the fifth embodiment. Even when the gas-liquid supply section is configured as in this embodiment, the same effects as those of the fifth embodiment can be obtained.

Moreover, the ejector 18 that is disclosed in any of the second, the third, the eighth, and the ninth embodiments can be adopted in the ejector-type refrigeration cycle 10b of this embodiment.

Seventh Embodiment

Figure 14:
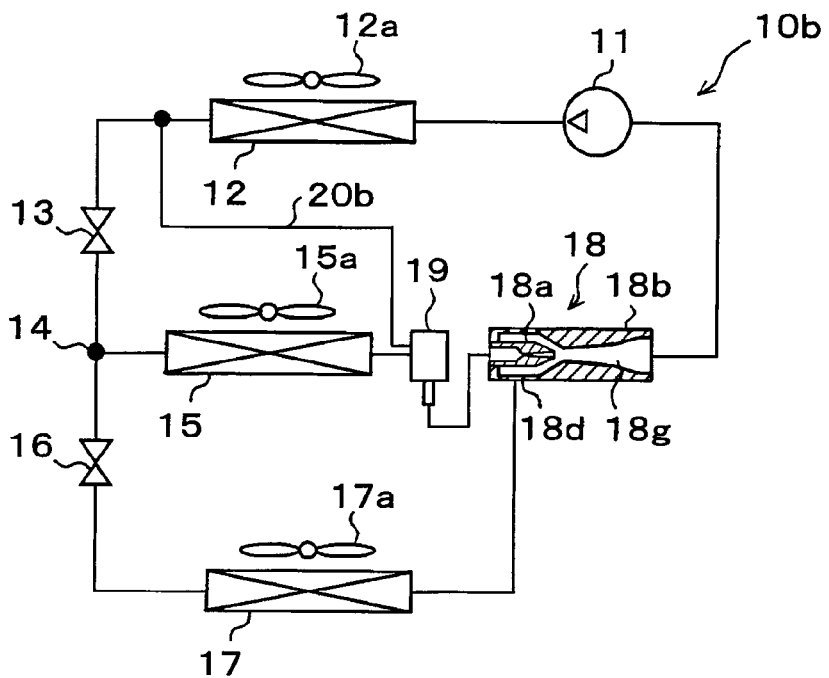
FIG. 14 is an overall configuration diagram of an ejector-type refrigeration cycle of a seventh embodiment.

In this embodiment, a description will be made on an example in which a configuration of an ejector-type refrigeration cycle is changed from that in the fifth embodiment as shown in FIG. 14.

More specifically, the ejector-type refrigeration cycle 10b of this embodiment further has a condensed refrigerant passage 20b that guides a liquid-phase refrigerant flowing out of the heat radiator 12 into the liquid storage tank 19. The condensed refrigerant passage 20b is desirably provided with a throttle section for preventing an increase in refrigerant pressure in the liquid storage tank 19. Accordingly, in this embodiment, the condensed refrigerant passage 20b is constructed of a capillary tube.

Thus, the liquid storage tank 19 that is a gas-liquid supply section of this embodiment is configured (i) to mix the liquid-phase refrigerant flowing out of the heat radiator 12 and a gas-phase refrigerant flowing out of the first evaporator 15 and (ii) to make the mixed refrigerant flow out to an inlet side of the nozzle portion 18a. The rest of the configuration and actuation are the same as those in the fifth embodiment. Even when the gas-liquid supply section is configured as in this embodiment, the same effects as those of the fifth embodiment can be obtained.

In addition, the ejector 18 that is disclosed in any of the second, the third, the eighth, and the ninth embodiments can be adopted in the ejector-type refrigeration cycle 10b of this embodiment.

Eighth Embodiment

Figure 15:
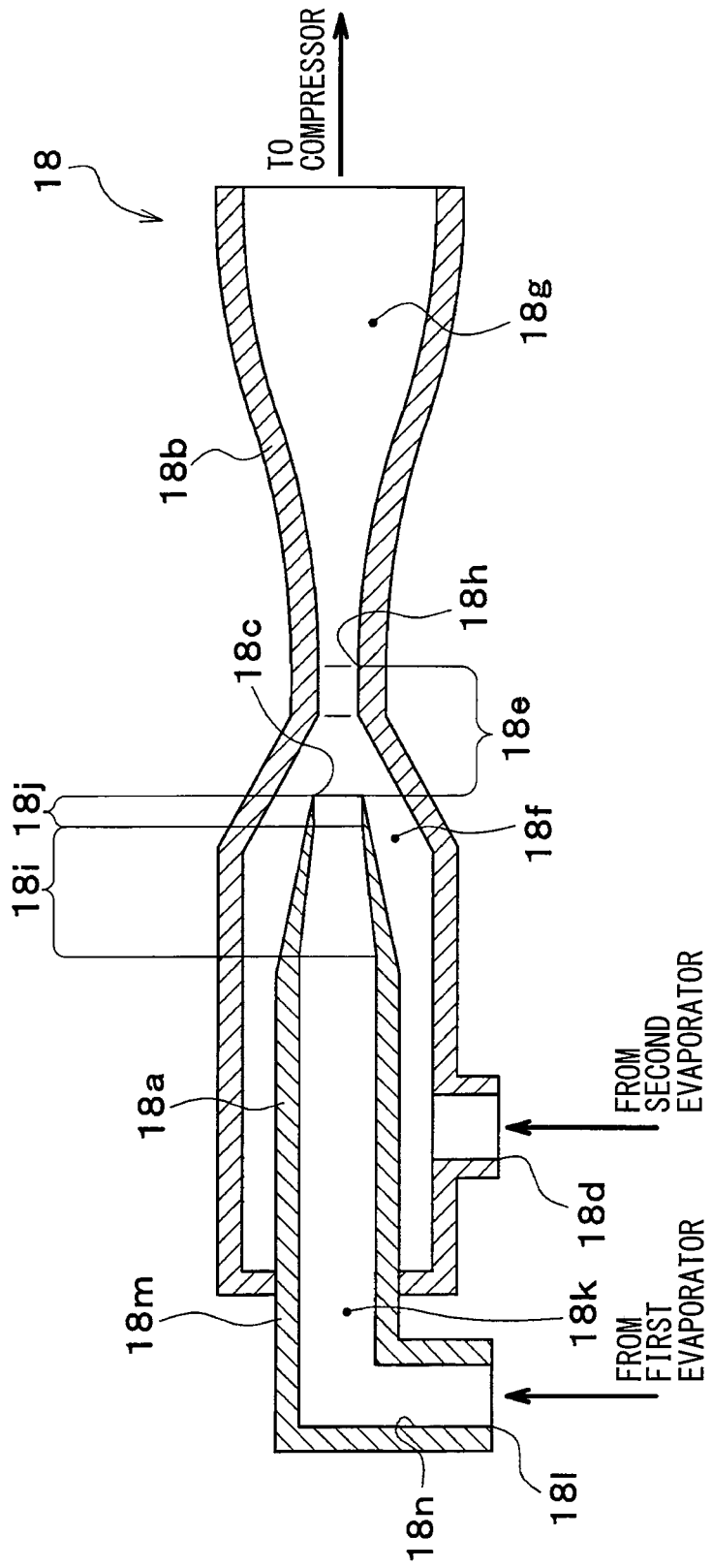
FIG. 15 is an axial cross-sectional view of an ejector of an eighth embodiment.

In this embodiment, as shown in FIG. 15, similar to the third embodiment, the swirl space 18k, which makes the refrigerant flowing out of the refrigerant inflow port 18l swirl, is provided on the inside of the cylindrical section 18m that is provided on a refrigerant flow upstream side in the nozzle portion 18a, with respect to the ejector 18 of the second embodiment. Configurations and actuation of other ejector 18 and the ejector-type refrigeration cycle 10 are similar to those of the second embodiment.

Thus, when the ejector-type refrigeration cycle 10 of this embodiment is actuated, similar to the second embodiment, vehicle cabin inside air that is blown into a vehicle cabin and box inside air that is circulated and blown into a cool box can be cooled.

In addition, in the ejector 18 of this embodiment, similar to the third embodiment, the refrigerant swirls in the swirl space 18k. Accordingly, a gas-liquid two-phase refrigerant in which a condensation nucleus is generated can flow into the nozzle portion 18a, and nozzle efficiency $\eta$noz can thereby be improved. Thus, deterioration of refrigerant pressure boosting performance in the diffuser section 18g can be restricted.

Furthermore, similar to the second embodiment, an injection refrigerant that is injected from the refrigerant injection port 18c of the nozzle portion 18a is expanded freely. Accordingly, an increase in wall surface friction can be restricted. Thus, the deterioration of the refrigerant pressure boosting performance of the ejector 18 can be restricted by reducing energy loss of the refrigerant in the nozzle portion 18a.

Moreover, similar to the first embodiment, the refrigerant pressure boosting performance in the diffuser section 18g can be stabilized, and ejector efficiency $\eta$ej in the ejector 18 can be improved. Thus, in the ejector-type refrigeration cycle 10 of this embodiment, an effect in improving a COP that is achieved by including the ejector 18 can sufficiently be obtained.

Ninth Embodiment

Figure 16:
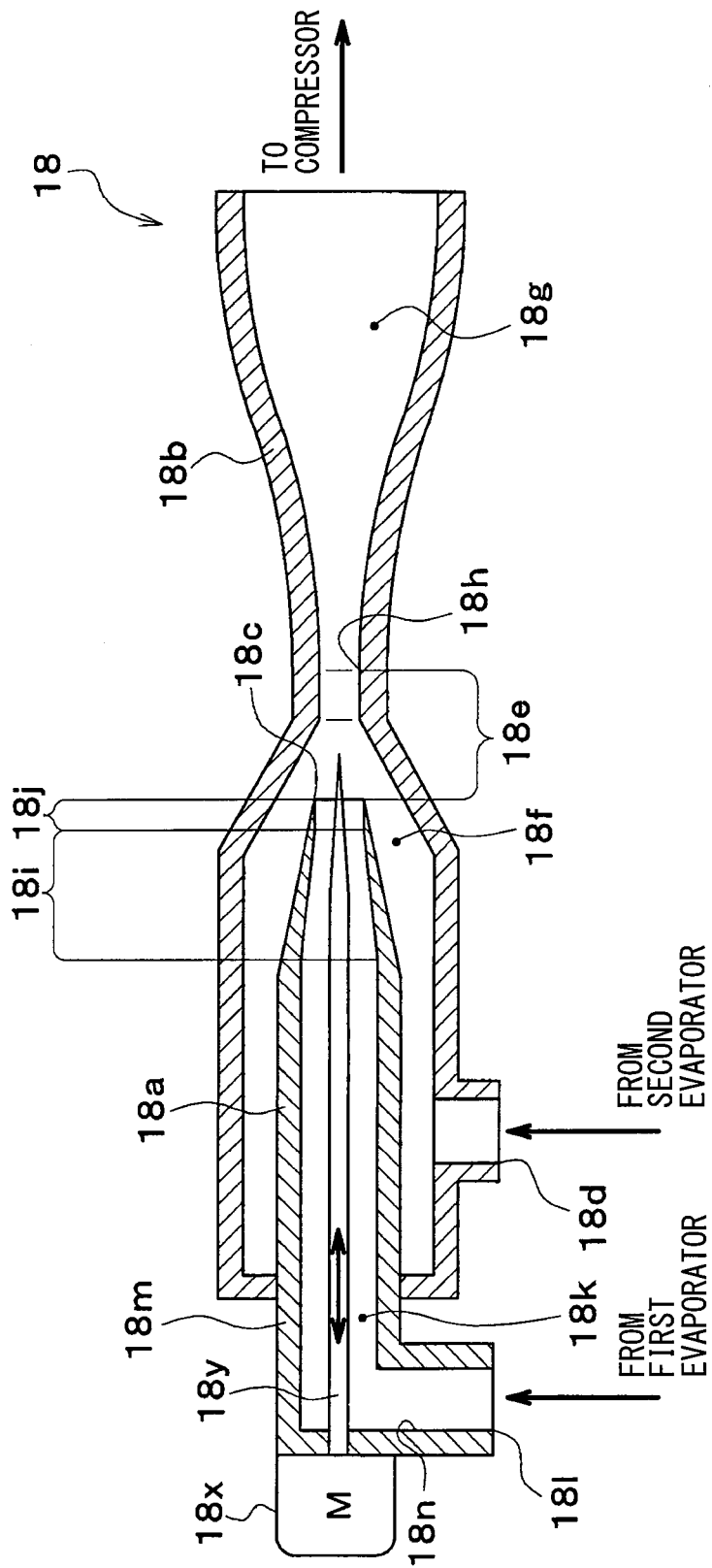
FIG. 16 is an axial cross-sectional view of an ejector of a ninth embodiment.

In the eighth embodiment, a description is made on an example in which a fixed nozzle, in which a refrigerant passage area of a minimum passage area section formed in an inlet section of the injecting section 18j is fixed, is adopted as the nozzle portion 18a of the ejector 18. In this embodiment, a description will be made on an example in which as shown in FIG. 16, a variable nozzle that is configured be capable of changing the refrigerant passage area of the minimum passage cross-sectional area section is adopted.

More specifically, the ejector 18 of this embodiment has: a needle valve 18y as a valve body that varies the refrigerant passage area of the nozzle portion 18a; and a stepping motor 18x as a drive section that displaces the needle valve 18y.

The needle valve 18y is formed in a needle shape, a center axis of which is coaxially arranged with a center axis of the nozzle portion 18a. More specifically, the needle valve 18y is formed in a tapered shape toward a refrigerant flow downstream side, and is arranged such that a tapered tip on the lowermost downstream side is projected toward the refrigerant flow downstream side of the refrigerant injection port 18c of the nozzle portion 18a. That is, the nozzle portion 18a of this embodiment is constructed as a so-called plug nozzle.

The stepping motor 18x is arranged on the refrigerant inflow port 18l side of the nozzle portion 18a and displaces the needle valve 18y in an axial direction of the nozzle portion 18a. In this way, a cross-sectional area of the refrigerant passage that is formed between an inner circumferential wall surface of the nozzle portion 18a and an outer circumferential wall surface of the needle valve 18y and that has an annular cross section is changed. Actuation of the stepping motor 18x is controlled by a control signal output from a controller.

Configurations and actuation of the other ejector 18 and an ejector-type refrigeration cycle 10 are similar to those of the eighth embodiment. Thus, in the ejector-type refrigeration cycle 10 and the ejector 18 of this embodiment, similar effects as those of the eighth embodiment can be obtained.

In addition, according to the ejector 18 of this embodiment, the nozzle portion 18a is constructed as the variable nozzle. Thus, a refrigerant flow rate that corresponds to a load of the ejector-type refrigeration cycle 10 can flow into the nozzle portion 18a of the ejector 18.

Furthermore, since the nozzle portion 18a of this embodiment is constructed as the plug nozzle, an injection refrigerant can be injected from the refrigerant injection port 18c to the mixing portion 18e along an outer surface of the needle valve 18y. Thus, the injection refrigerant can easily be expanded freely even when the refrigerant flow rate flowing into the nozzle portion 18a is changed, and loss of kinetic energy of the refrigerant that flows through the refrigerant passage can be restricted by reducing wall surface friction between the refrigerant and the refrigerant passage.

Moreover, as shown in FIG. 16, the needle valve 18y of this embodiment is arranged to penetrate the inside of the swirl space 18k. Thus, a condensation nucleus is easily generated by friction between the refrigerant that swirls in the swirl space 18k and an inner wall surface of the nozzle portion 18a.

Figure 17:
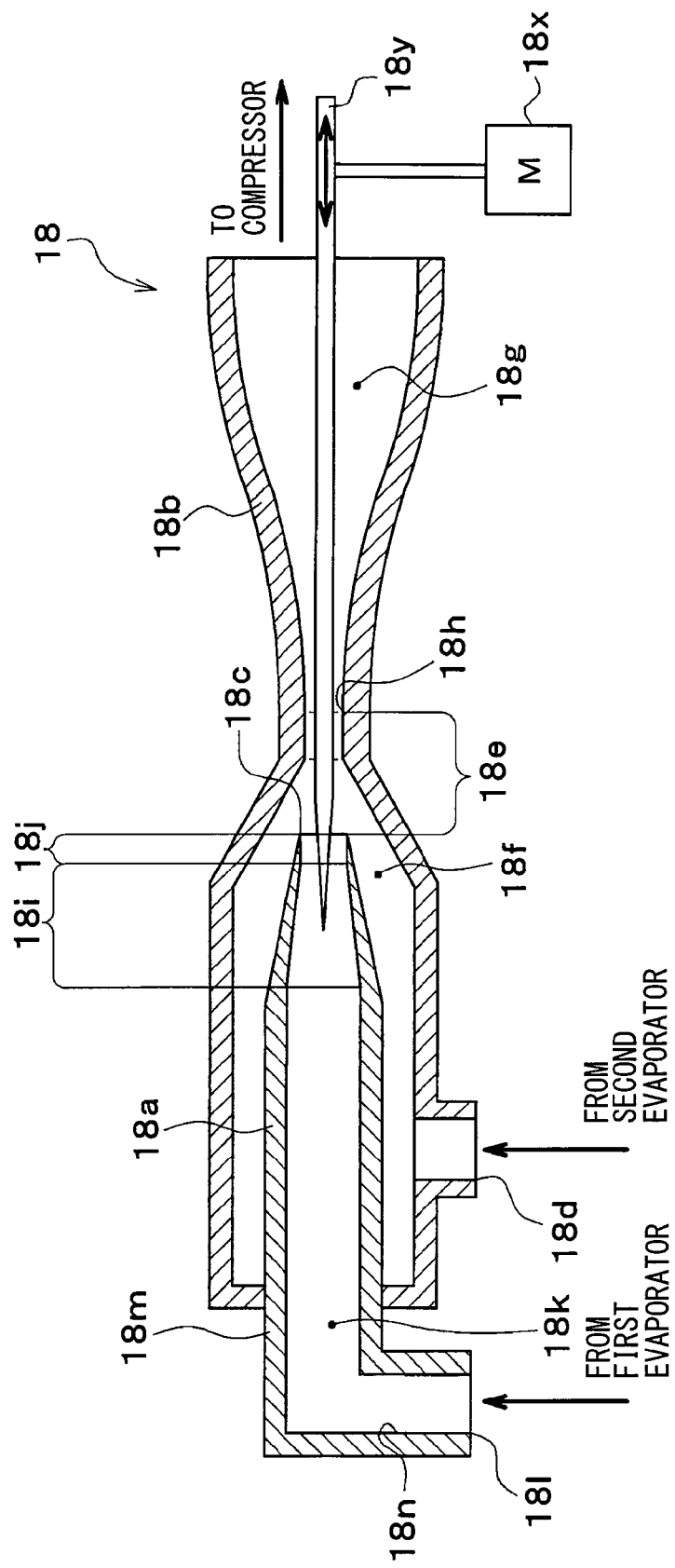
FIG. 17 is an axial cross-sectional view of an ejector of a modified example of the ninth embodiment.

In the nozzle portion 18a shown in FIG. 16, the valve in the tapered shape toward the refrigerant flow downstream side is adopted as the needle valve 18y. However, as in a modified example shown in FIG. 17, a valve in a shape that is tapered from the diffuser section 18g side toward a refrigerant flow upstream side may be adopted. In this case, the needle valve 18y only needs to be arranged such that a tapered tip on the uppermost stream side is projected to a tapered section 18i side from the injecting section 18j.

Tenth Embodiment

Figure 18:
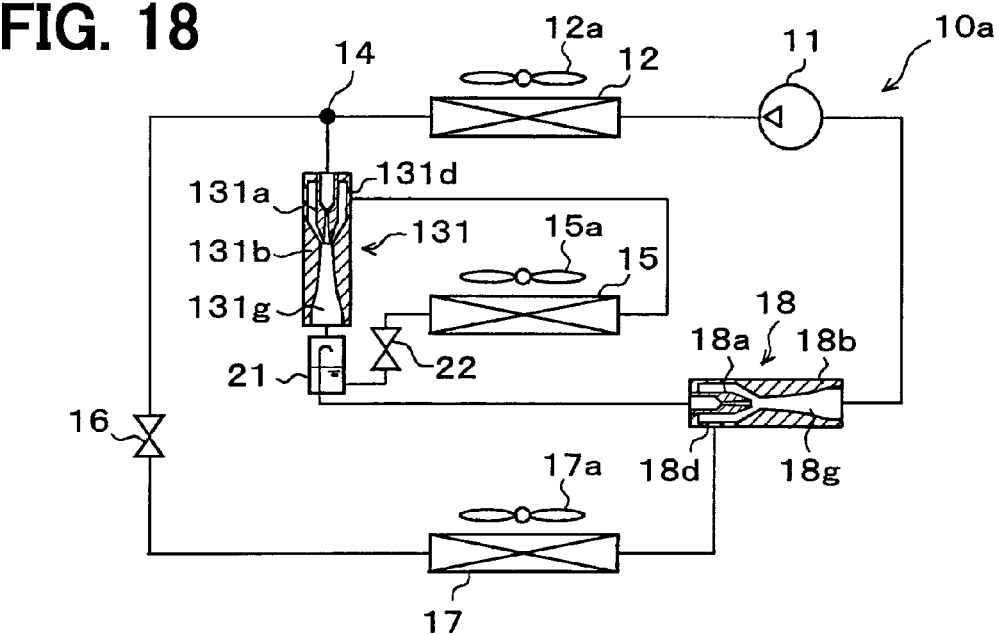
FIG. 18 is an overall configuration diagram of an ejector-type refrigeration cycle of a tenth embodiment.

In this embodiment, a description will be made on an example in which a configuration of an ejector-type refrigeration cycle 10a is changed from that in the fourth embodiment. More specifically, in the ejector-type refrigeration cycle 10a of this embodiment, as shown in FIG. 18, a high-stage-side ejector 131 is adopted as a first decompression section, instead of the high-stage-side throttle device 13.

A basic configuration of the high-stage-side ejector 131 is similar to that of the above-described ejector 18. Thus, similar to the ejector 18, the high-stage-side ejector 131 also has a high-stage-side nozzle portion 131a and a high-stage-side body portion 131b. The high-stage-side nozzle portion 131a reduces pressure of a refrigerant. The high-stage-side body portion 131b is formed with (i) a high-stage-side refrigerant suction port 131d that draws the refrigerant flowing out of the first evaporator 15 and (ii) a high-stage-side diffuser section (i.e., a high-stage-side pressure increase portion) 131g that boosts pressure of a mixed refrigerant.

Here, liquid-phase refrigerant condensed in the heat radiator 12 can flow into the high-stage-side nozzle portion 131a of the high-stage-side ejector 131 of this embodiment. Accordingly, in the high-stage-side ejector 131, a case where the high-stage-side diffuser section 131g is incapable of exerting desired pressure boosting performance due to a flow of a gas-liquid two-phase refrigerant with a high quality into the high-stage-side nozzle portion 131a does not occur.

For this reason, instead of an ejector that has exactly the same configuration as the above-described ejector 18, the high-stage-side ejector 131 of this embodiment is set to be capable of exerting a high COP as the entire ejector-type refrigeration cycle 10a at a time that the liquid-phase refrigerant flows into the high-stage-side nozzle portion 131a.

A gas-liquid separator 21 that separates a liquid-phase refrigerant and a gas-phase refrigerant of the refrigerant flowing out of the high-stage-side diffuser section 131g of the high-stage-side ejector 131 is connected to an outlet side of the high-stage-side diffuser section 131g of the high-stage-side ejector 131.

A refrigerant inflow port of the first evaporator 15 is connected to a liquid-phase refrigerant outflow port of the gas-liquid separator 21 via a fixed throttle 22. A refrigerant suction port of the high-stage-side ejector 131 is connected to a refrigerant outflow port of the first evaporator 15. Meanwhile, an inlet side of the nozzle portion 18a of the ejector 18 is connected to a gas-phase refrigerant outlet port of the gas-liquid separator 21. The rest of the configuration is the same as that in the fourth embodiment.

Accordingly, when the ejector-type refrigeration cycle 10a of this embodiment is actuated, a flow of the liquid-phase refrigerant flowing out of the heat radiator 12 is branched in the branch section 14. One of the refrigerants branched in the branch section 14 flows into the high-stage-side nozzle portion 131a of the high-stage-side ejector 131 and is injected after being decompressed in an isentropic manner.

Then, by a suction action of the injection refrigerant, the refrigerant flowing out of the first evaporator 15 is drawn from the high-stage-side refrigerant suction port 131d of the high-stage-side ejector 131. A mixed refrigerant of the injection refrigerant injected from the high-stage-side nozzle portion 131a and the suction refrigerant drawn from the high-stage-side refrigerant suction port 131d flows into the high-stage-side diffuser section 131g, and pressure thereof is boosted.

The refrigerant flowing out of the high-stage-side diffuser section 131g flows into the gas-liquid separator 21 and is separated into the gas-phase refrigerant and the liquid-phase refrigerant. Then, the liquid-phase refrigerant separated in the gas-liquid separator 21 flows into the first evaporator 15 via the fixed throttle 22. Meanwhile, the gas-phase refrigerant separated in the gas-liquid separator 21 flows into the nozzle portion 18a of the ejector 18. The rest of the actuation is the same as that in the fourth embodiment.

Thus, according to the ejector-type refrigeration cycle 10a of this embodiment, similar effects as those of the fourth embodiment can be obtained. Furthermore, the COP as the entire cycle can further be improved since the consumed power of the compressor 11 can be reduced by the pressure boosting action of the high-stage-side ejector 131.

Figure 19:
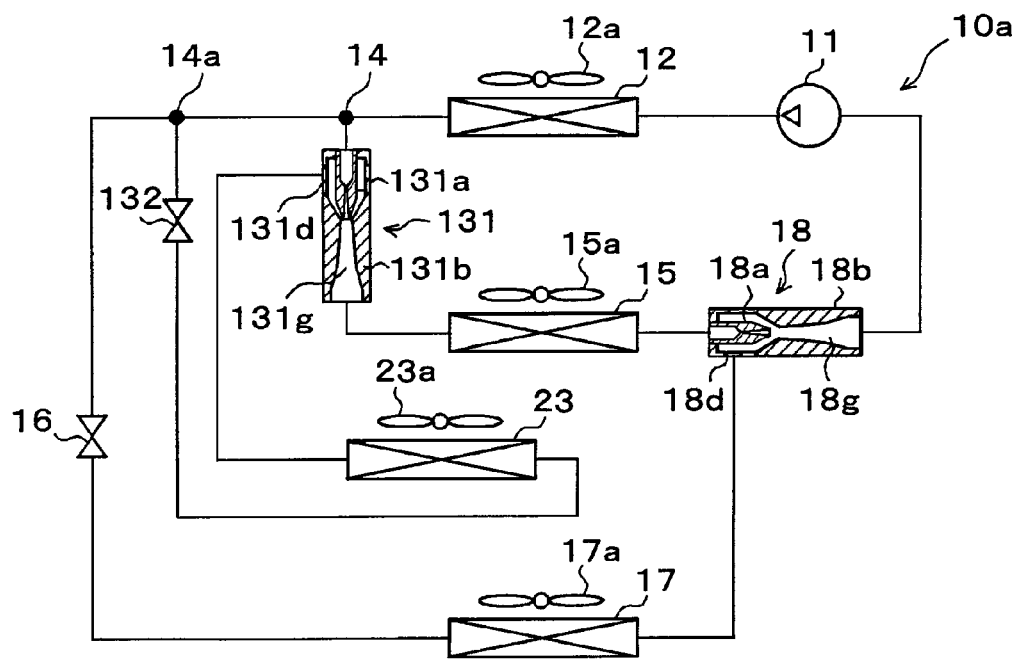
FIG. 19 is an overall configuration diagram of an ejector-type refrigeration cycle of a modified example of the tenth embodiment.

The ejector-type refrigeration cycle 10a in which the high-stage-side ejector 131 is adopted as the first decompression section is not limited to the cycle configuration shown in FIG. 18, however, may be configured as shown in FIG. 19.

More specifically, in the ejector-type refrigeration cycle 10a shown in FIG. 19, the refrigerant inlet side of the first evaporator 15 is connected to the outlet side of the high-stage-side diffuser section 131g of the high-stage-side ejector 131. Furthermore, a second branch section 14a that further branches the refrigerant flow is connected to the other refrigerant outflow port of the branch section (first branch section) 14.

A refrigerant inflow port of a third evaporator 23 is connected to a refrigerant outflow port of the second branch section 14a via a fixed throttle 132. The high-stage-side refrigerant suction port 131d of the high-stage-side ejector 131 is connected to a refrigerant outflow port of the third evaporator 23. The third evaporator 23 is a heat absorption heat exchanger that evaporates a low-pressure refrigerant so as to exert a heat absorbing action by exchanging heat between a low-pressure refrigerant decompressed in the fixed throttle 132, and air blown from a third blower fan 23a.

A refrigerant inflow port of the second evaporator 17 is connected to the other refrigerant outflow port of the second branch section 14a via the low-stage-side throttle device 16. The rest of the configuration is the same as that in the fourth embodiment. Also with such a cycle configuration, the COP as the entire cycle can further be improved by the pressure boosting action of the high-stage-side ejector 131.

Other Embodiments

The present disclosure is not limited to the above-described embodiments. Various modifications can be made thereto as follows within a scope that does not depart from the gist of the present disclosure.

(1) In the above-described embodiments, the examples in which any of the ejector-type refrigeration cycles 10, 10a, 10b that include the ejector 18 is applied as the vehicular refrigeration cycle device, the vehicle cabin inside air is cooled in the first evaporator 15, and the box inside air is cooled in the second evaporator 17 are described. However, application of each of the ejector-type refrigeration cycles 10, 10a, 10b is not limited thereto.

For example, in the case of the application to the vehicular refrigeration cycle device, front seat air to be blown to a vehicle front seat side may be cooled in the first evaporator 15, and rear seat air to be blown to a vehicle rear seat may be cooled in the second evaporator 17.

In addition, for example, in the case of the application to a refrigeration and freezer device, refrigeration chamber air to be blown to a refrigeration chamber for storing food, beverages, and the like at a low temperature (more specifically, 0° C. to 10° C.) may be cooled in the first evaporator 15, and freezer chamber air to be blown to a freezer chamber for freezing and storing food and the like at an extremely low temperature (more specifically, −20° C. to −10° C.) may be cooled in the second evaporator 17.

(2) In the above-described embodiments, the examples in which the ejector 18 is applied to the ejector-type refrigeration cycles 10, 10a, 10b are described. However, the cycle configurations to which the ejector 18 can be applied are not limited thereto.

For example, in each of the ejector-type refrigeration cycles 10, 10a, 10b, an accumulator, which separates the refrigerant flowing out of the diffuser section 18g into a gas-phase refrigerant and a liquid-phase refrigerant and makes the separated gas-phase refrigerant flow out to the suction port side of the compressor 11, may be arranged between the outlet side of the diffuser section 18g of the ejector 18 and the suction port side of the compressor 11.

In addition, a liquid receiver, which separates the refrigerant flowing out of the heat radiator 12 into a gas-phase refrigerant and a liquid-phase refrigerant and makes the liquid-phase refrigerant flow to the downstream side, may be arranged on the refrigerant outlet side of the heat radiator 12. Furthermore, an internal heat exchanger that exchanges heat between the high-temperature refrigerant flowing out of the heat radiator 12 and the low-temperature refrigerant to be drawn into the compressor 11 may be arranged. Moreover, an auxiliary pump for pressure-feeding the refrigerant may be provided between the refrigerant outlet side of the second evaporator 17 and the refrigerant suction port 18d of the ejector 18.

(3) In the above-described embodiments, the examples in which the thermal expansion valve, the fixed throttle, and the high-stage-side ejector are adopted as the high-stage-side throttle device 13 and the low-stage-side throttle device 16 are described. However, an electric variable throttle mechanism that has: a valve body configured to be capable of changing a throttle opening degree; and an electric actuator including a stepping motor for changing the throttle opening degree of the valve body may be adopted as the high-stage-side throttle device 13 and the low-stage-side throttle device 16.

In the above-described embodiments, the example in which the heat radiator constructed of the heat exchange section that exchanges heat between the discharged refrigerant discharged from the compressor 11 and the outside air is adopted as the heat radiator 12 has been described. However, a so-called sub-cool-type condenser that has a condensing section, a modulator section, and a supercooling section may be adopted as the heat radiator 12. The condensing section exchanges heat between the discharged refrigerant and the outside air, so as to condense the discharged refrigerant. The modulator section separates the refrigerant discharged from the condensing section into a gas-phase refrigerant and a liquid-phase refrigerant. The supercooling section exchanges heat between a liquid-phase refrigerant flowing out of the modulator section and the outside air, so as to supercool the liquid-phase refrigerant.

In addition, in the above-described embodiments, the examples in which the components such as the body portion 18b of the ejector 18 are made of metal are described. However, a material is not limited as long as the function of each of the components can be exerted. That is, these components may be made of resin.

(4) In the above-described embodiments, the examples in which the refrigerant passage cross-sectional area of the inlet section 18h of the diffuser section 18g is set smaller than the refrigerant passage cross-sectional area of the refrigerant injection port 18c of the nozzle portion 18a are described. However, more specifically, the opening diameter of the refrigerant injection port 18c may only need to be set smaller than the opening diameter of the inlet section 18h.

In addition, in the case where the opening diameter of the inlet section 18h is set larger than the opening diameter of the refrigerant injection port 18c, the refrigerant passage cross-sectional area of the inlet section 18h may be set smaller than the refrigerant passage cross-sectional area of the refrigerant injection port 18c by providing a projecting section that is projected toward the inside of the refrigerant passage in the inlet section 18h.

(5) In the above-described ninth embodiment, the example in which the refrigerant passage cross-sectional area of the minimum passage cross-sectional area section of the refrigerant passage formed in the nozzle portion 18a can be changed by the valve body (i.e., the needle body 18y) has been described. However, a configuration in which a conical valve body that extends from the refrigerant passage formed in the nozzle portion 18a to the inside of the diffuser section 18g may be adopted as the valve body and in which the cross-sectional area of the diffuser section 18g is changed at the same time as that of the minimum passage cross-sectional area section of the nozzle portion 18a may be adopted.

(6) In the above-described embodiment, the example in which R134a is adopted as the refrigerant has been described. However, the refrigerant is not limited thereto. For example, R600a, R1234yf, R410A, R404A, R32, R1234yfxf, R407C, or the like may be adopted. Alternatively, a mixed refrigerant in which plural types of these refrigerants are mixed or the like may be adopted.

(7) The means disclosed in each of the above embodiments may appropriately be combined within a range that can be implemented. For example, the gas-liquid supply section described in the fifth to the seventh embodiments may be applied to the ejector-type refrigeration cycle 10a described in the fourth embodiment. For example, the ejector 18 that is disclosed in any of the second, the third, the eighth, and the ninth embodiments can be applied as the ejector 18 of the ejector-type refrigeration cycle 10a of the tenth embodiment.

(8) In the above-described embodiments, the heat radiator 12 is used as an exterior heat exchanger that exchanges heat between the refrigerant and the outside air, and the first, second evaporators 15, 17 are used as an interior heat exchanger that cool the air. However, reversely, the present disclosure may be applied to a heat pump cycle in which the first, second evaporators 15, 17 are constructed as the exterior heat exchangers that absorb heat from a heat source such as the outside air and in which the heat radiator 12 is constructed as the interior heat exchanger that heats the fluid to be heated, such as the air and water.

What is claimed is:

1. An ejector for a vapor compressional refrigeration cycle device that has a first evaporator and a second evaporator evaporating a refrigerant, the ejector comprising:
   a nozzle portion that decompresses the refrigerant flowing out of the first evaporator until the refrigerant becomes a gas-liquid two-phase state, the nozzle portion injecting the refrigerant from a refrigerant injection port;
   a body portion;
   a refrigerant suction port that is provided in the body portion and draws a refrigerant flowing out of the second evaporator as a suction refrigerant by a suction action of an injection refrigerant injected from the nozzle portion;
   a pressure increase portion that is provided in the body portion and boosts pressure of a mixed refrigerant of the injection refrigerant and the suction refrigerant; and
   a swirl space forming member that forms a swirl space in which the refrigerant flowing into the nozzle portion swirls around an axis of the nozzle portion, wherein
   the nozzle portion has an inlet that is connected to a liquid storage section, the liquid storage section being disposed in the vapor compressional refrigeration cycle and storing a surplus refrigerant in the vapor compressional refrigeration cycle, a gas-liquid two phase refrigerant flowing out of the liquid storage section,
   the liquid storage section has an inlet directly connected to a refrigerant outlet of the first evaporator and an outlet connected to the inlet of the nozzle portion, and
   the gas-liquid two phase refrigerant flowing out of the liquid storage section flows into the inlet of the nozzle portion.

2. The ejector according to claim 1 further comprising:
   a mixing portion that is provided in an area from the refrigerant injection port to an inlet section of the pressure increase portion in an internal space of the body portion and mixes the injection refrigerant and the suction refrigerant, wherein
   a distance from the refrigerant injection port to the inlet section in the mixing portion is determined such that a flow velocity of the refrigerant flowing into the inlet section becomes lower than or equal to a two-phase sound velocity.

3. The ejector according to claim 2, wherein
when the distance from the refrigerant injection port to the inlet section in the mixing portion is referred to as La, and when a diameter of a circle is referred to as $\phi Da$, the circle that is converted as a circle of which area has a total value of (i) an opening cross-sectional area of the refrigerant injection port and (ii) a refrigerant passage cross-sectional area of a suction passage through which the suction refrigerant flows, the circle being converted in a cross section, perpendicular to an axial direction, of the nozzle portion including the refrigerant injection port,
the following formula is satisfied:

$$La/\phi Da \leq 1.$$

4. The ejector according to claim 2, wherein
a refrigerant passage area of the inlet section is set smaller than a refrigerant passage area of the refrigerant injection port.

5. The ejector according to claim 1 further comprising:
   a mixing portion that is provided in the area from the refrigerant injection port to the inlet section of the pressure increase portion in the internal space of the body portion and mixes the injection refrigerant and the suction refrigerant; and
   a tapered section, in which a refrigerant passage cross-sectional area is gradually reduced toward a refrigerant flow downstream side, and an injecting section guiding the refrigerant from the tapered section to the refrigerant injection port, the tapered section and the injecting section provided as a refrigerant passage formed in the nozzle portion, wherein
   the nozzle portion is formed to freely expand the injection refrigerant that is injected to the mixing portion by setting an expanding angle in an axial cross section of the injecting section to be larger than or equal to 0°.

6. The ejector according to claim 1, wherein
the mixing portion has a shape in which the refrigerant passage cross-sectional area is reduced toward the refrigerant flow downstream side.

7. The ejector according to claim 1, wherein
the mixing portion is formed in a shape that is a combination of (i) a truncated cone shape in which the refrigerant passage cross-sectional area is gradually reduced toward the refrigerant flow downstream side and (ii) a columnar shape in which the refrigerant passage cross-sectional area is fixed.

8. The ejector according to claim 7, wherein
when an axial length of the nozzle portion in a columnar-shaped portion of the mixing portion is referred to as Lb, and when a diameter of a columnar-shaped portion is referred to as $\phi Db$, a formula of $Lb/\phi Db \leq 1$ is satisfied.

9. The ejector according to claim 1, further comprising
a valve body changing the refrigerant passage area of the nozzle portion.

* * * * *